(12) United States Patent
Honma et al.

(10) Patent No.: US 7,824,770 B2
(45) Date of Patent: Nov. 2, 2010

(54) MOLDING MATERIAL, PREPREG AND FIBER-REINFORCED COMPOSITE MATERIAL, AND METHOD FOR PRODUCING FIBER-REINFORCED MOLDING SUBSTRATE

(75) Inventors: Masato Honma, Ehime (JP); Shiro Honda, Ehime (JP); Shunsuke Horiuchi, Aichi (JP); Koji Yamauchi, Aichi (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 12/531,621

(22) PCT Filed: Feb. 22, 2008

(86) PCT No.: PCT/JP2008/053014

§ 371 (c)(1),
(2), (4) Date: Sep. 16, 2009

(87) PCT Pub. No.: WO2008/114573

PCT Pub. Date: Sep. 25, 2008

(65) Prior Publication Data

US 2010/0068518 A1    Mar. 18, 2010

(30) Foreign Application Priority Data

Mar. 20, 2007 (JP) .............................. 2007-072399
Mar. 22, 2007 (JP) .............................. 2007-074251
Mar. 22, 2007 (JP) .............................. 2007-074253
Mar. 22, 2007 (JP) .............................. 2007-074254

(51) Int. Cl.
*D02G 3/00* (2006.01)

(52) U.S. Cl. ...................... 428/373; 428/370; 428/374; 428/378; 428/297.4; 524/609

(58) Field of Classification Search .............. 428/297.4, 428/373, 370, 374, 378; 524/609, 524, 538, 524/500; 525/420, 437, 471
See application file for complete search history.

(56) References Cited

U.S. PATENT DOCUMENTS 4,680,224 A * 7/1987 O'Connor ................ 428/298.1

(Continued)

FOREIGN PATENT DOCUMENTS

JP           3-88828 A           4/1991

(Continued)

OTHER PUBLICATIONS

International Search Report dated Apr. 8, 2008, application No. PCT/JP2008/053014.

(Continued)

*Primary Examiner*—N. Edwards
(74) *Attorney, Agent, or Firm*—RatnerPrestia

(57) ABSTRACT

This invention relates to: a molding material comprising a bundle of continuous reinforcing fibers (A), a polyarylene sulfide prepolymer (B) comprising at least 50% by weight of cyclic polyarylene sulfide and having the weight average molecular weight of less than 10,000 or polyarylene sulfide (B') having the weight average molecular weight of 10,000 or greater and the degree of dispersion of 2.5 or lower, and thermoplastic resin (C); a prepreg comprising a resin composition comprising the polyarylene sulfide prepolymer (B) impregnated into a reinforcing fiber; and a method for producing a fiber-reinforced molding substrate comprising step (I) of continuously feeding a bundle of continuous reinforcing fibers, step (II) of combining cyclic polyarylene sulfide with the reinforcing fiber bundle, step (III) of heating the composite obtained in step (II) to subject the cyclic polyarylene sulfide to ring-opening polymerization to convert into polyarylene sulfide, and step (IV) of cooling the composite obtained in step (III) and withdrawing the same.

10 Claims, 14 Drawing Sheets

U.S. PATENT DOCUMENTS

| | | | |
|---|---|---|---|
| 5,093,155 A * | 3/1992 | Miyazaki et al. | 427/177 |
| 5,286,809 A * | 2/1994 | Heinz et al. | 525/420 |
| 5,397,608 A * | 3/1995 | Soens | 428/34.5 |
| 5,488,084 A * | 1/1996 | Kadoi et al. | 524/423 |
| 5,679,456 A * | 10/1997 | Sakai et al. | 428/340 |
| 5,789,073 A * | 8/1998 | Odagiri et al. | 428/297.4 |
| 5,869,599 A | 2/1999 | Hay et al. | |
| 6,027,794 A * | 2/2000 | Ozaki et al. | 428/297.7 |
| 6,455,143 B1 * | 9/2002 | Ishibashi et al. | 428/294.1 |
| 6,828,374 B2 | 12/2004 | Ishibashi et al. | |
| 6,949,288 B2 * | 9/2005 | Hodge et al. | 428/370 |
| 7,750,111 B2 * | 7/2010 | Horiuchi et al. | 528/388 |
| 2010/0068518 A1 * | 3/2010 | Honma et al. | 428/401 |
| 2010/0137531 A1 * | 6/2010 | Horiuchi | 525/537 |

FOREIGN PATENT DOCUMENTS

| | | |
|---|---|---|
| JP | 5-39371 A | 2/1993 |
| JP | 5-163349 A | 6/1993 |
| JP | 8-118489 A | 5/1996 |
| JP | 9-25346 A | 1/1997 |
| JP | 10-77408 A | 3/1998 |
| JP | 10-138379 A | 5/1998 |
| WO | WO2007/034800 A1 | 3/2007 |

OTHER PUBLICATIONS

"Polymerization of poly (p-phenylene sulfide) from a cyclic precursor", Dean A. Zimmerman, et al., Polymer, vol. 37, No. 14, pp. 3111-3116, 1996.

* cited by examiner

US 7,824,770 B2

MOLDING MATERIAL, PREPREG AND FIBER-REINFORCED COMPOSITE MATERIAL, AND METHOD FOR PRODUCING FIBER-REINFORCED MOLDING SUBSTRATE

This application is a U.S. National Phase Application of PCT International Application No. PCT/JP2008/053014, filed Feb. 22, 2008, which claims priority to Japanese Patent Application No. 2007-072399, filed Mar. 20, 2007, Japanese Patent Application No. 2007-074251, filed Mar. 22, 2007, Japanese Patent Application No. 2007-074253, filed Mar. 22, 2007, Japanese Patent Application No. 2007-074254, filed Mar. 22, 2007, the contents of all applications being incorporated by reference herein in their entirety.

FIELD OF THE INVENTION

The present invention relates to a long-fiber-reinforced thermoplastic resin molding material, a prepreg that is useful for obtaining a high-performance fiber-reinforced composite material, a fiber-reinforced composite material using the same that is suitable for aerospace and general industrial applications, and a method for producing a fiber-reinforced molding substrate.

BACKGROUND OF THE INVENTION

A wide variety of configurations, such as thermoplastic prepregs, yarn, or glass mats (GMT), are known as molding materials comprising continuous reinforcing fiber bundles and thermoplastic resin as the matrices. Such molding materials are characterized in that molding is easy because of a feature of a thermoplastic resin, it is free from a burden of storage unlike a thermosetting resin, toughness of the resulting molded product is high, and its recycle efficiency is excellent. In particular, molding materials that have been processed into the form of pellets can be applied for molding techniques that are excellent in economic efficiency and productivity, such as injection molding or stamping molding. Thus, such materials are useful as industrial materials.

In order to impregnate a thermoplastic resin into a bundle of continuous reinforcing fibers during a process of molding material production, however, such material is problematic in terms of economic efficiency and productivity. Thus, applications thereof are not very extensive at present. For example, it is well-known that impregnation of a resin into a reinforcing fiber bundle becomes more difficult as the melt viscosity of the resin becomes high. In particular, a thermoplastic resin having excellent dynamic properties, such as toughness or ductility, is a polymer, which has higher viscosity than a thermosetting resin and requires higher process temperature. Thus, such material was inadequate in order to produce a molding material easily with good productivity.

When a low-molecular-weight; i.e., low-viscous, thermoplastic resin is used as a matrix resin because of an ease of impregnation, disadvantageously, the dynamic properties of the resulting molded product would be significantly deteriorated. A molding material comprising a composite of a low-molecular-weight thermoplastic polymer and continuous reinforcing fibers and a high-molecular-weight thermoplastic resin in contact therewith is disclosed (e.g., JP Patent Publication (kokai) No. H10-138379 A (1998)).

This molding material involves the use of a low-molecular-weight compound to impregnate into a bundle of continuous reinforcing fibers and a high-molecular-weight compound as a matrix resin. Thus, such molding material is satisfactory in terms of economic efficiency, productivity, and dynamic properties. When this molding material is subjected to injection molding, such material is easily blended with a matrix resin while minimizing damage on the reinforcing fibers at the time of material plasticization during molding. Thus, a molded product that is excellent in fiber dispersion can be produced. Accordingly, the resulting molded product can have longer reinforcing fibers than conventional molded products and such molded product can have satisfactory dynamic properties and excellent appearance quality.

In recent years, however, a fiber-reinforced composite material has drawn much attention, applications thereof becomes more extensive and specialized, a molding material that is excellent in molding performance, handleability, and dynamic properties of the resulting molded product has become desired, and higher economic efficiency and productivity are required at industrial levels. A wide variety of technical development has become required. For example, the impregnation performance of a low-molecular-weight compound is to be enhanced to reduce the operational burden, a molding material having higher thermoresistance is to be suggested, fiber dispersion at the time of molding is to be more improved to further increase the fiber length to improve the dynamic properties, and the surface appearance is to be further improved.

Under such circumstances, disadvantageously, a low-molecular-weight thermoplastic resin undergoes pyrolysis at a processing temperature in the molding process, the resin generates a pyrolysis gas, which in turn contaminates the environment, and a pyrolysis gas becomes a void in the molded product and deteriorates the dynamic properties. Accordingly, development of a molded material that has excellent thermoresistance and that would not cause the environmental contamination around the molding equipment has been awaited.

A fiber-reinforced composite material comprising a reinforcing fiber and a matrix resin is light weight and it is capable of producing excellent strength properties. Also, an arbitrary strength can be realized via regulation of fiber orientation. Thus, such material is extensively used for sports applications, such as golf shafts and fishing poles, aerospace applications, such as aircraft parts and satellite parts, and general industrial applications, such as automobiles and boats and ships, electric/electronic equipment chassises, robot parts, windmills, tanks, bathtubs, and helmets. When producing a fiber-reinforced composite material, a method involving the use of prepreg materials each comprising a reinforcing fiber, which has been impregnated with a matrix resin in advance, as an intermediate substrate to prepare a prepreg laminate is extensively carried out because such method is generally easy to enhance a fiber content and is relatively easily carried out. As a matrix resin to be impregnated into a reinforcing fiber in a prepreg, thermosetting resins, such as unsaturated polyester resin, vinyl ester resin, or epoxy resin, are often used because of ease of impregnation into a fiber bundle. Thermosetting resin becomes an insoluble and infusible polymer having a three-dimensional network structure via curing, such polymer is difficult to recycle, and disposal thereof becomes more serious.

A variety of resins, such as polyethylene, polyester, polyamide, or polycarbonate, are used as thermoplastic matrix resins for prepregs. In the case of aerospace applications or the like that require high performance, polyether ether ketone, polyetherimide, polyphenylene sulfide, or the like that is excellent in terms of thermoresistance, chemical resistance, and mechanical properties is preferably used. Use of polyarylene sulfides, such as polyphenylene sulfide, is particularly preferable.

However, the molecular weight of such thermoplastic resin, prepreg, is higher than that of a thermosetting resin during the process of production in which a fiber bundle is impregnated with a matrix resin. Thus, processing of such thermoplastic resin needs to be carried out at a high temperature and a high pressure, and production of prepregs having a high fiber content is difficult. Also, the produced prepregs are often not impregnated, and mechanical properties are not satisfactory.

In order to overcome such drawbacks, a method for preparing prepregs wherein a slurry of polyarylene sulfides is prepared in a dispersion medium to facilitate impregnation thereof into a glass fiber mat (e.g., JP Patent Publication (kokai) No. H5-39371 A (1993)) and a method of preparing a sheet of a polyarylene sulfide having a relatively low molecular weight, and laminating the same with a fiber substrate to prepare a laminate without a prepreg (e.g., JP Patent Publication (kokai) No. H9-25346 A (1997)) are known. The former method, however, requires equipment and time to remove a dispersion medium. Further, it is difficult to completely remove the dispersion medium, and mechanical properties would be disadvantageously unsatisfactory because of voids resulting from evaporation of the dispersion medium at the time of lamination. Also, the latter method requires molding to be carried out at a high temperature and a high pressure, and mechanical properties would be disadvantageously unsatisfactory because of insufficient impregnation.

A fiber-reinforced composite material comprising a bundle of continuous reinforcing fibers and a matrix resin has light weight and excellent dynamic properties. Such material is extensively used for sports applications, aerospace applications, and general industrial applications. In particular, a composite material comprising a carbon fiber as a reinforcing fiber (CFRP) has specific strength and specific rigidity that are superior to those of metal materials, and the amount thereof used is increasing mainly for aerospace applications. To date, a thermosetting resin has been preferably used as a matrix resin because of its good impregnation into a reinforcing fiber bundle. A thermoplastic resin has a high molecular weight and higher viscosity than that of a thermosetting resin, and processing thereof needs to be carried out at a higher processing temperature. Accordingly, a thermoplastic resin was not suitable for producing a fiber-reinforced molding substrate easily with good productivity.

In recent years, however, a composite material comprising a thermoplastic resin as a matrix resin is effective in order to shorten the molding time, the molded product resulting therefrom is advantageous for recycle, and post-processability, such as heat adhesion or heat correction, is excellent. Thus, such composite material has drawn attention in various applications. Among thermoplastic resins, polyarylene sulfide has high elastic modulus, high thermoresistance, and excellent fluidity. From the viewpoint of improvement in dynamic properties of molded products, such composite material can be preferably used as a fiber-reinforced composite material. Thus, a method for producing a fiber-reinforced molding substrate comprising a bundle of continuous reinforcing fibers and polyarylene sulfide in a more cost-effective and productive manner has been awaited.

As a method for producing a fiber-reinforced molding substrate comprising a bundle of continuous reinforcing fibers and a thermoplastic resin, for example, a method comprising placing crystalline thermoplastic resin films on the surface and the opposite surface of a sheet-like reinforcing fiber bundle, and applying a pressure at 5 to 30 kg/cm$^2$ (about 0.5 to 3 MPa) at a temperature that is 150° C. higher than a resin melting point to impregnate the thermoplastic resin into the reinforcing fiber bundle is proposed (see JP Patent Publication (kokai) No. H8-118489 A (1996)). In this method, however, impregnation of thermoplastic resin needs to be carried out at harsh temperature. This disadvantageously causes resin pyrolysis, and properties of the molded product cannot be brought to a satisfactory level. Thus, it is difficult to produce a molding substrate in a cost-effective and productive manner.

In order to easily impregnate thermoplastic resin into a bundle of continuous reinforcing fibers, a method for producing a molding material comprising first impregnating a low-molecular-weight thermoplastic resin into fiber and integrating the fiber with a high-molecular-weight thermoplastic resin is proposed (see JP Patent Publication (kokai) No. H10-138379 A (1998)). According to this method, impregnation performance can be satisfactory with the use of a low-molecular-weight thermoplastic resin. However, handleability of the molding material is disadvantageously insufficient, and it is difficult to bring the properties of the molded product to a satisfactory level.

Thus, a method for producing a fiber-reinforced molding substrate comprising polyarylene sulfide impregnated into a bundle of continuous reinforcing fibers in a simple and productive manner has not yet been satisfactorily proposed.

SUMMARY OF THE INVENTION

The present invention is intended to overcome one or more of the above-described drawbacks of conventional techniques. Accordingly, the present invention is intended to provide a molding material comprising a bundle of continuous reinforcing fibers and thermoplastic resin with the use of thermoplastic resin having excellent impregnation properties into the bundle of reinforcing fibers, so that the resulting molded material is substantially or completely free of deterioration in economic efficiency and productivity at the time of production thereof, and the molding material can easily produce a molded product having reinforced fibers satisfactorily dispersed in the molded product at the time of injection molding and having excellent fluidity and handleability and sufficient dynamic properties. With the use of thermoplastic resin that can satisfy both conditions for impregnation and low-gas properties, further, the present invention is intended to provide a molding material that can easily produce a molded product having reinforced fibers satisfactorily dispersed in the molded product at the time of injection molding and having excellent heat resistance and dynamic properties, without contaminating the environment.

Also, the present invention is intended to provide a prepreg that can produce a laminate having excellent moldability and mechanical properties and to provide a fiber-reinforced composite material having excellent mechanical properties and flameproofness using the same.

Further, the present invention is intended to provide a method that can produce a fiber-reinforced molding substrate comprising a bundle of continuous reinforcing fibers and polyarylene sulfide in an easy and productive manner.

According to exemplary embodiments, the present invention provides the following.

(1) A molding material comprising:

(i) 1 to 50% by weight of a bundle of continuous reinforcing fibers (A);

(ii) 0.1 to 10% by weight of a polyarylene sulfide prepolymer (B) comprising at least 50% by weight of cyclic polyarylene sulfide and having a weight average molecular weight of less than 10,000 or polyarylene sulfide (B') having a weight average molecular weight of 10,000 or greater and having the degree of dispersion represented by weight average molecular weight/number average molecular weight of 2.5 or smaller; and (iii) 40 to 98.9% by weight of thermoplastic resin (C), wherein component (C) adheres to a composite of component (A) and component (B) or (B').

(2) The molding material according to (1), wherein the melting point of component (B) is 100° C. to 250° C.

(3) The molding material according to (1), wherein a decrease in the weight of component (B') when heated satisfies the condition represented by the equation below:

$$\Delta Wr=(W1-W2)/W1\times 100 \leq 0.18(\%)$$

wherein Δ Wr represents a percentage of weight decrease (%), which is determined based on the weight of the sample (W2) at 330° C. relative to the weight of the sample (W1) at 100° C. when performing thermogravimetric analysis under the ordinary pressure and a non-oxidizing atmosphere from 50° C. to arbitrary temperature of 330° C. or higher at a temperature increase rate of 20° C./min.

(4) The molding material according to any of (1) to (3), wherein component (A) comprises at least 10,000 carbon fiber monofilaments.

(5) The molding material according to any of (1), (2), and (4), wherein component (ii) is component (B) and component (C) is at least one component selected from among polyamide resin, polyester resin, and polyphenylene sulfide resin.

(6) The molding material according to any of (1), (3), and (4), wherein component (ii) is component (B') and component (C) is at least one compliment selected from among polyamide resin, polyetherimide resin, polyamide imide resin, polyether ether ketone resin, and polyphenylene sulfide resin.

(7) The molding material according to any of (1) to (6), wherein component (A) is arranged substantially parallel to the direction of the shaft center and the length of component (A) is substantially the same as that of the molding material.

(8) The molding material according to (7), wherein the composite of component (A) and component (B) or (B') has a core structure and component (C) surrounds the composite to form a core-in-sheath structure.

(9) The molding material according to (8), wherein the form of the molding material is a long-fiber pellet.

(10) The molding material according to any of (1) to (9), wherein the length is 1 mm to 50 mm.

(11) A prepreg comprising a resin composition, wherein the composition comprises a polyarylene sulfide prepolymer comprising at least 50% by weight of cyclic polyarylene sulfide and having a weight average molecular weight of less than 10,000 and the composition is impregnated into a reinforcing fiber.

(12) The prepreg according to (11), wherein the reinforcing fiber content is 60 to 80% by weight.

(13) A fiber-reinforced composite material obtained by polymerization of the resin composition containing the polyarylene sulfide prepolymer in the prepreg according to (11) or (12).

(14) A laminate of fiber-reinforced composite material obtained by laminating the prepreg according to (11) or (12), followed by polymerization of the resin composition containing the polyarylene sulfide prepolymer.

(15) A method for producing a fiber-reinforced molding substrate comprising:

(I) withdrawing and continuously feeding a bundle of continuous reinforcing fibers;

(II) combining cyclic polyarylene sulfide with the reinforcing fiber bundle;

(III) heating the composite of the reinforcing fiber bundle and the cyclic polyarylene sulfide obtained in step (II) to 200° C. to 450° C. and subjecting the cyclic polyarylene sulfide to ring-opening polymerization to convert into polyarylene sulfide; and (IV) cooling the composite obtained in step (III) and withdrawing the same, wherein the weight average molecular weight of the cyclic polyarylene sulfide combined in step (II) is less than 5,000 and the weight average molecular weight of the polyarylene sulfide after ring-opening polymerization in step (III) is 5,000 or greater.

(16) The method for producing a fiber-reinforced molding substrate according to (15), wherein steps (I) to (IV) are carried out on-line.

(17) The method for producing a fiber-reinforced molding substrate according to (15) or (16), wherein step (I) comprises heating thereinforcing fiber bundle to 50° C. to 500° C.

(18) The method for producing a fiber-reinforced molding substrate according to any of (15) to (17), wherein step (II) comprises combining the cyclic polyarylene sulfide and linear polyarylene sulfide with the reinforcing fiber bundle.

(19) The method for producing a fiber-reinforced molding substrate according to (18), wherein the combining of the cyclic polyarylene sulfide and the linear polyarylene sulfide with the reinforcing fiber bundle involves the use of a mixture of the cyclic polyarylene sulfide and the linear polyarylene sulfide in which 50 to 99% by weight is accounted for by the cyclic polyarylene sulfide.

(20) The method for producing a fiber-reinforced molding substrate according to any of (15) to (19), wherein step (II) comprises dispersing at least one form of the cyclic polyarylene sulfide selected from the group consisting of particulate, fibrous, and flaky forms in a gas phase and allowing the reinforcing fiber bundle to pass through the gas phase.

(21) The method for producing a fiber-reinforced molding substrate according to any of (15) to (19), wherein step (II) comprises dispersing or dissolving at least one form of the cyclic polyarylene sulfide selected from the group consisting of particulate, fibrous, and flaky forms in a liquid phase and allowing the reinforcing fiber bundle to pass through the liquid phase.

(22) The method for producing a fiber-reinforced molding substrate according to (21), wherein step (II) comprises allowing the reinforcing fiber bundle to pass through the liquid phase, followed by removing the liquid.

(23) The method for producing a fiber-reinforced molding substrate according to (21), wherein the liquid phase is an emulsion or dispersion.

(24) The method for producing a fiber-reinforced molding substrate according to (20) or (21), wherein the cyclic polyarylene sulfide is particulate and has an average particle diameter of 50 μm to 300 μm.

(25) The method for producing a fiber-reinforced molding substrate according to (20) or (21), wherein the cyclic polyarylene sulfide is fibrous and has an average fiber diameter of 0.5 μm to 50 μm.

(26) The method for producing a fiber-reinforced molding substrate according to any of (15) to (19), wherein step (II) comprises arranging at least one form of the cyclic polyarylene sulfide selected from the group consisting of film, sheet, and unwoven fabric forms so as to be in contact with the reinforcing fiber bundle.

(27) The method for producing a fiber-reinforced molding substrate according to any of (15) to (19), wherein step (II) comprises heat-melting the cyclic polyarylene sulfide and feeding the same so as to be in contact with the reinforcing fiber bundle.

(28) The method for producing a fiber-reinforced molding substrate according to any of (20), (21), (26), and (27), wherein step (II) comprises heating the composite of the reinforcing fiber bundle and the cyclic polyarylene sulfide to 100° C. to 300° C.

(29) The method for producing a fiber-reinforced molding substrate according to (28), wherein step (II) further comprises applying a pressure of 0.1 to 5 MPa.

(30) The method for producing a fiber-reinforced molding substrate according to any of (15) to (29), wherein step (III) comprises heating under a non-oxidizing atmosphere.

(31) The method for producing a fiber-reinforced molding substrate according to any of (15) to (30), wherein step (III) comprises heating under a reduced pressure of 0.1 to 50 kPa.

(32) The method for producing a fiber-reinforced molding substrate according to any of (15) to (31), wherein step (III) comprises applying a pressure of 0.5 to 10 MPa simultaneously with or after heating of the composite of the reinforcing fiber bundle and the cyclic polyarylene sulfide.

(33) The method for producing a fiber-reinforced molding substrate according to any of (15) to (32), wherein the rate of withdrawal in step (IV) is 5 to 100 m/min.

(34) The method for producing a fiber-reinforced molding substrate according to any of (15) to (33), wherein the ratio of the polyarylene sulfide to the reinforcing fiber in the fiber-reinforced molding substrate is 10 to 50:50 to 90 by weight (%).

(35) The method for producing a fiber-reinforced molding substrate according to any of (15) to (34), wherein the polyarylene sulfide subjected to ring-opening polymerization comprises 0.1 to 20% by weight of the cyclic polyarylene sulfide relative to the total weight of the polyarylene sulfide.

(36) The method for producing a fiber-reinforced molding substrate according to any of (15) to (35), wherein the reinforcing fiber bundle comprises at least 10,000 carbon fiber monofilaments.

(37) The method for producing a fiber-reinforced molding substrate according to any of (15) to (36), wherein the percentage of the fiber-reinforced molding substrate being impregnated with polyarylene sulfide is from 80% to 100%.

(38) The method for producing a fiber-reinforced molding substrate according to any of (15) to (36), wherein the percentage of the fiber-reinforced molding substrate being impregnated with polyarylene sulfide is from 20% to less than 80%.

(39) The method for producing a fiber-reinforced molding substrate according to any of (15) to (36), wherein the percentage of the fiber-reinforced molding substrate being impregnated with the polyarylene sulfide is from 0% to less than 20%.

The molding material of an exemplary embodiment of the present invention involves the use of a polyarylene sulfide prepolymer (B), as component (ii), comprising at least 50% by weight of cyclic polyarylene sulfide and having the weight average molecular weight of less than 10,000. This material can further enhance economic efficiency and productivity of the resulting molded product. Also, a molded product exhibiting satisfactory dispersion of reinforcing fiber in the molded product at the time of injection molding and having excellent dynamic properties can be easily produced.

The molding material of an exemplary embodiment of the present invention involves the use of polyarylene sulfide (B'), as component (ii), having the weight average molecular weight of 10,000 or greater and the degree of dispersion represented by weight average molecular weight/number average molecular weight of 2.5 or smaller. This material can easily produce a molded product exhibiting satisfactory dispersion of reinforcing fiber in the molded product at the time of injection molding and having excellent thermoresistance and excellent dynamic properties without contaminating the environment.

The prepreg of an exemplary embodiment of the present invention can produce a fiber-reinforced composite material that is excellent in terms of handleability and moldability, has high fiber content, and has excellent mechanical properties. Also, the fiber-reinforced composite material of an exemplary embodiment of the present invention is excellent in flameproofness as well as in mechanical properties.

The production method of an exemplary embodiment of the present invention enables easy impregnation of polyarylene sulfide into a bundle of continuous reinforcing fibers. This can realize enhanced productivity, such as the increased rate of withdrawal. Thus, the method can be preferably employed in order to produce fiber-reinforced molding substrate of a prepreg, semipreg, fabric, or the like.

Figure 1:
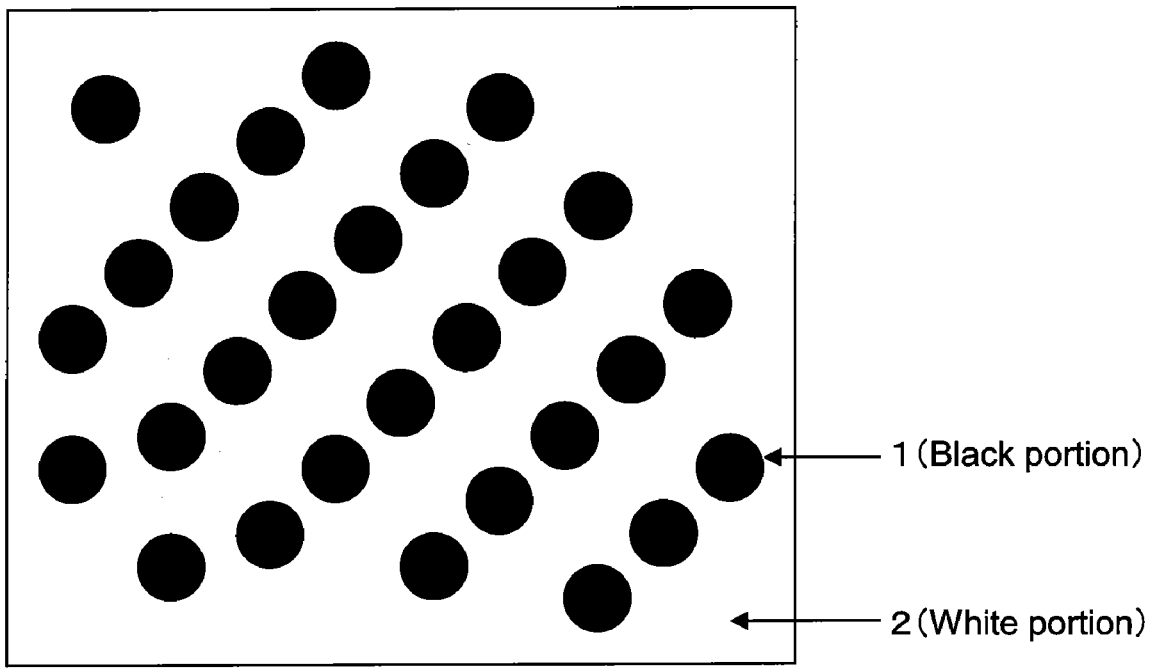
FIG. 1 schematically shows an embodiment of a composite of a reinforcing fiber bundle (A) and a polyarylene sulfide prepolymer (B) or polyarylene sulfide (B').

Description of Reference Numerals Used in FIGS. 1 to 11
1: Reinforcing fiber bundle (A)
2: Polyarylene sulfide prepolymer (B) or polyarylene sulfide (B')
3: Composite of reinforcing fiber bundle (A) and polyarylene sulfide prepolymer (B) or polyarylene sulfide (B')
4: Thermoplastic resin (C)

Figure 12:
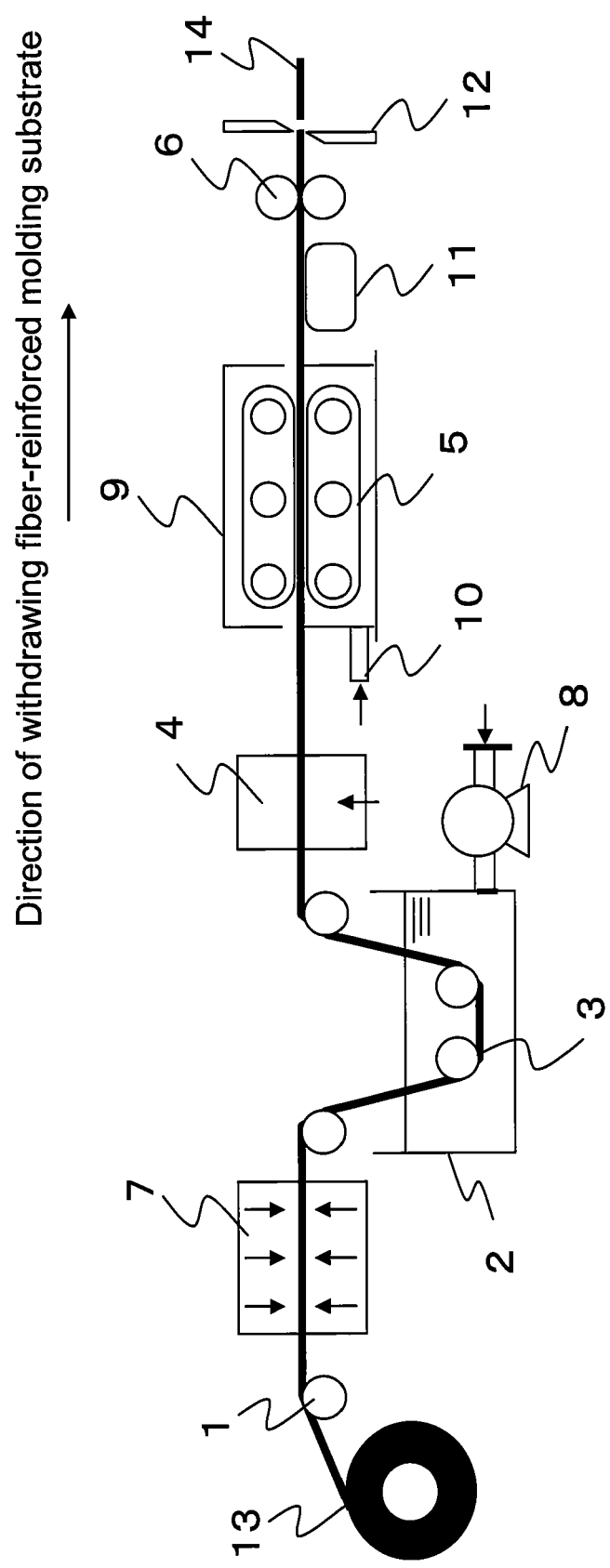

FIG. 12 shows an embodiment of an apparatus used for the method for producing a fiber-reinforced molding substrate of the present invention.

Figure 13:
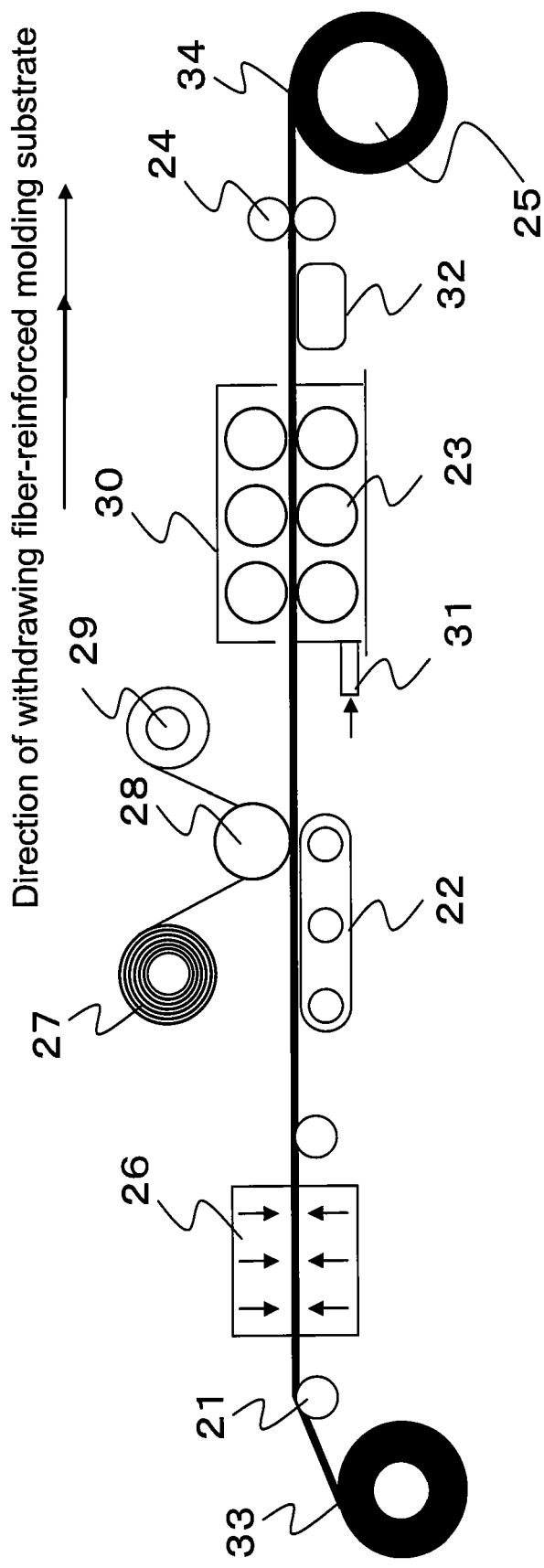

FIG. 13 shows an embodiment of an apparatus used for the method for producing a fiber-reinforced molding substrate of the present invention.

Figure 14:
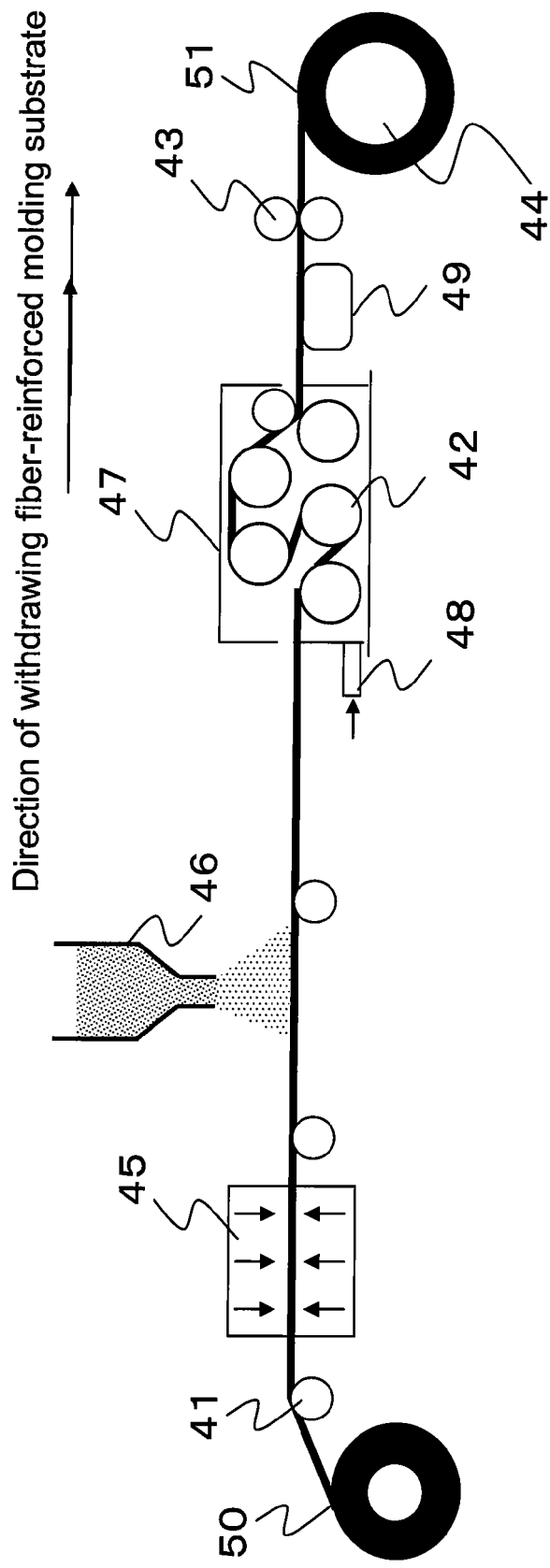

FIG. 14 shows an embodiment of an apparatus used for the method for producing a fiber-reinforced molding substrate of the present invention.

Description of Reference Numerals Used in FIGS. 12 to 14
1, 21, 41: Roll bar
2: Impregnation bath
3: Rotating roller
4: Hot air drying oven
5: Double belt press
6, 24, 43: Nip roller
7, 26, 45: Infrared heater
8: Pump
9: Chamber
10, 31, 48: Air inlet
11, 32, 49: Cooling plate
12: Guillotine cutter
13, 33, 50: Reinforcing fiber bundle
14, 34, 51: Fiber-reinforced molding substrate
22: Belt conveyor
23: Impregnation roller
25, 44: Drum winder
27: Withdraw winder
28: Hot roller
29: Take-up winder
30, 47: Heating chamber
42: Calendar roller
46: Metering powder feeder

DETAILED DESCRIPTION OF THE INVENTION

The molding material of an exemplary embodiment of the present invention is constituted by a bundle of continuous reinforcing fibers (A), a polyarylene sulfide prepolymer (B) or polyarylene sulfide (B'), and thermoplastic resin (C).

When a polyarylene sulfide prepolymer (B) is used for the molding material, dispersion of reinforcing fiber in the molded product can be satisfactory at the time of injection molding, and a molded product having excellent fluidity and handleability and satisfactory dynamic properties can be easily produced.

When a polyarylene sulfide (B') is used for the molding material, dispersion of reinforcing fiber in the molded product can be satisfactory at the time of injection molding, and a molded product having satisfactory fluidity, handleability, thermoresistance, and dynamic properties can be easily produced without contaminating the environment.

At the outset, components are described.

The reinforcing fiber that can be used in the present invention is not particularly limited. Examples thereof include, but are not limited to, carbon fiber, glass fiber, aramid fiber, boron fiber, alumina fiber, mineral fiber, and silicon carbide fiber. Two or mote types of such fibers can be used in combination.

A carbon fiber is excellent in terms of specific strength and specific rigidity and thus is particularly preferable in order to enhance dynamic properties of the molded product. In order to obtain a molded product having a light weight, high strength, and high elastic modulus, use of a carbon fiber is preferable, and use of a carbon fiber having tensile elastic modulus of 200 to 700 GPa is particularly preferable. Further, a carbon fiber or metal-coated reinforcing fiber has high electric conductivity. Thus, such fiber has the effects of enhancing electric conductivity of the molded product. Use of such fiber is particularly preferable for a housing of electronic equipment that requires electromagnetic shielding properties, for example.

According to a more preferable embodiment of a carbon fiber, the amount of surface functional groups (O/C), which is the ratio of oxygen (O) to carbon (C) atoms on the fiber surface determined via x-ray photoelectron spectroscopy, is between 0.05 and 0.4. The higher the O/C value, the larger the amount of functional groups on the carbon fiber surface. This can enhance adhesion of the fiber to the matrix resin. If the O/C value is excessively high, however, the crystalline structure on the carbon fiber surface may be ruined. When the O/C value is within a preferable range, a molded product having excellently balanced dynamic properties can be obtained.

The amount of surface functional groups (O/C) is determined via x-ray photoelectron spectroscopy in the following manner. At the outset, a sizing agent or the like is removed from the carbon fiber with the use of a solvent, the carbon fiber is cut, and the resultants are spread and arranged on the copper sample support. Thereafter, spectroscopy is performed with the electron emitting angle set at 90°, with the use of $MgK_{\alpha1,2}$ as the X-ray source, and maintaining the interior of the sample chamber at $1 \times 10^{-8}$ Torr. As compensation for the peaks accompanying the electrostatic charge during the measurement, the kinetic energy value of the main peak C1S (K.E.) is first matched to 969 eV. The area of the C1S peak is determined by drawing a linear base line in the range of 958 to 972 eV as K.E. The area of the O1S peak is determined by drawing a linear base line in the range of 714 to 726 eV as K.E. The amount of surface functional groups (O/C) is expressed as an atomic ratio calculated using the relative sensitivity factor unique to the apparatus based on the ratio of the O1S peak area to the C1S peak area.

A reinforcing fiber bundle becomes more advantageous in terms of economic efficiency as the number of reinforcing fiber monofilaments increases. Thus, the number of monofilaments is preferably 10,000 or greater. As the reinforcing fiber monofilaments increases, however, impregnation of the matrix resin tends to be deteriorated. When a bundle of carbon fibers is used as a bundle of reinforcing fibers, the number of monofilaments is more preferably between 15,000 and 100,000, and particularly preferably between 20,000 and 50,000, in order to realize satisfactory economic efficiency and impregnation properties. In particular, the effects of an exemplary embodiments of the present invention; i.e., excellent impregnation of thermoplastic resin at the time of production of a molding material and satisfactory dispersion of reinforcing fibers into the molded product at the time of injection molding, can cope with a bundle of reinforcing fibers having a greater number of fibers.

Further, a sizing agent may be used in addition to component (B) or (B') in order to bundle monofilaments to the reinforcing fiber bundle. By adhering the sizing agent to the reinforcing fiber bundle, handleability of the reinforcing fiber at the time of transportation or processability at the time of production of the molding material can be improved. Within the scope of the present invention, conventional sizing agents, such as epoxy resin, urethane resin, acrylic resin, or various types of thermoplastic resins, can be used alone or in combinations of two or more.

The term "bundle of continuous reinforcing fibers (A)" that is used for the molding material refers that a reinforcing fiber bundle comprising unidirectionally arranged monofilaments is continuous in the longitudinal direction. All monofilaments of the reinforcing fiber bundle are not necessarily continuous throughout the whole length, and some monofilaments may be separated in the middle. Examples of such bundle of continuous reinforcing fibers include unidirectional, bidirectional, and multidirectional fiber bundles. Use of unidirectional fiber bundles is more preferable from the viewpoint of productivity at the time of production of the molding material.

The polyarylene sulfide prepolymer (B) that is used in an exemplary embodiment of the present invention comprises at least 50% by weight of cyclic polyarylene sulfide and has the weight average molecular weight of less than 10,000. The term "cyclic polyarylene sulfide" used herein refers to a cyclic compound comprising, as a principle constitutional unit, a repeat unit represented by the formula: —(Ar—S)— (wherein Ar represents an arylene group). For example, it is preferably a compound represented by formula (a) below having 80% by weight (or mole %) or higher, more preferably 90% by weight (or mole %) or higher, and further preferably 95% (or mole %) or higher of such repeat unit. Ar may be a unit represented by formula any of (b) to (l) below, with formula (b) being particularly preferable.

[Chemical Formula 1]

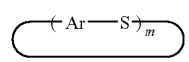
(a)

[Chemical Formula 2]

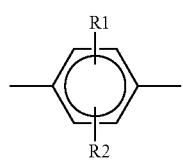
(b)

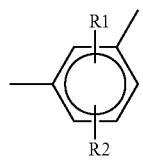
(c)

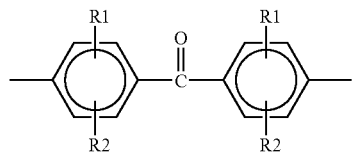
(d)

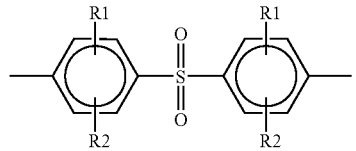
(e)

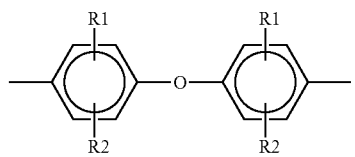
(f)

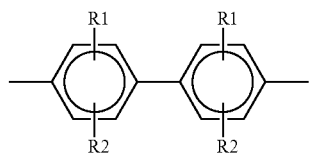
(g)

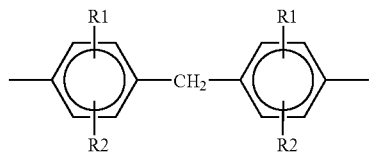
(h)

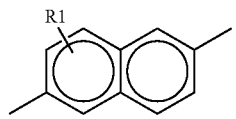
(i)

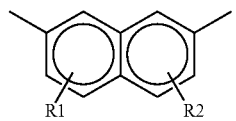
(j)

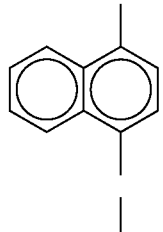
(k)

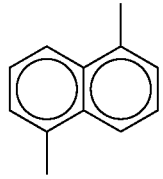
(l)

wherein R1 and R2 each represent a substituent selected from among hydrogen, alkyl having 1 to 12 carbon atoms, alkoxy having 1 to 12 carbon atoms, arylene having 6 to 24 carbon atoms, and halogen, and R1 and R2 may be the same or different.

As long as the cyclic polyarylene sulfide comprises such repeat unit as a principle constitutional unit, a minor amount of a branched or crosslinked unit represented by, for example, any of formulae (o) to (q) below can be included. The amount of such branched or crosslinked unit to be copolymerized is preferably 0% to 1% by mole relative to a mole of the —(Ar—S)— unit.

[Chemical Formula 3]

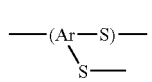
(o)

-continued

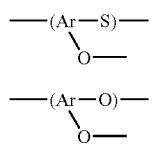

Cyclic polyarylene sulfide may comprise a repeat unit represented by any of formulae (b) to (l) at random or as a block or a mixture thereof. Representative examples thereof include a cyclic homopolymer or copolymer comprising the repeat unit represented by any of the formulae (b), (c), (g) to (l), cyclic polyphenylene sulfide sulfone (formula (e)), cyclic polyphenylene sulfide ketone (formula (d)), cyclic polyphenylene sulfide ether (formula (f), a cyclic random copolymer or cyclic block copolymer comprising any thereof, and a mixture of any thereof. An example of particularly preferable cyclic polyphenylene sulfide (hereafter abbreviated as "cyclic PPS") is a cyclic compound comprising, as a principle component, the —(Ar—S)— repeat unit, which is accounted for by 80% by weight (or mole %) or higher, and particularly 90% by weight (or mole %) or higher of the p-phenylene sulfide unit represented by the formula below.

[Chemical Formula 4]

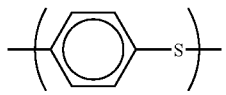

The number of repeat unit, m, in formula (a) of cyclic polyarylene sulfide is not particularly limited. For example, such number is preferably 2 to 50, more preferably 2 to 25, and further preferably 3 to 20. When m is greater than 50, the dissolving or melting temperature (i.e., a melting temperature and a dissolving temperature; the same applies hereinafter) of cyclic polyarylene sulfide becomes higher, and this may make impregnation into the reinforcing fiber substrate difficult.

Cyclic polyarylene sulfide may be either a single compound having a single number of repeat unit or a mixture of cyclic polyarylene sulfides having different number of repeat units. A mixture of cyclic polyarylene sulfides having different number of repeat units tends to have a lower dissolving or melting temperature than a single compound having a single number of repeat unit. Thus, the mixture is preferable for the ease of impregnation into the reinforcing fiber substrate.

In the present invention, components other than cyclic polyarylene sulfide in the polyarylene sulfide prepolymer are particularly preferably linear polyarylene sulfide oligomers. The term "linear polyarylene sulfide oligomers" used herein refers to a homooligomer or cooligomer having, as a principle component, a repeat unit represented by —(Ar—S)—, and preferably comprising 80% by mole or more of such repeat unit. Ar may be the unit represented by any of formulae (b) to (l) above, and the unit represented by formula (b) is particularly preferable. As long as the linear polyarylene sulfide oligomer comprises such repeat unit as a principle constitutional unit, a minor amount of a branched or crosslinked unit represented by, for example, any of formulae (o) to (q) below can be included. The amount of such branched or crosslinked unit to be copolymerized is preferably 0% to 1% by mole relative to a mole of the —(Ar—S)— unit. The linear polyarylene sulfide oligomer may be a random copolymer, a block copolymer, or a mixture thereof containing such repeat unit.

Representative examples thereof include a polyphenylene sulfide oligomer, a polyphenylene sulfide sulfone oligomer, a polyphenylene sulfide ketone oligomer, a polyphenylene sulfide ether oligomer, a random or block copolymer thereof, and a mixture thereof. An example of a particularly preferable linear polyarylene sulfide oligomer is a linear polyphenylene sulfide oligomer comprising 80% by mole or more, and particularly 90% by mole or more p-phenylene sulfide unit as a principle polymer constitutional unit.

In an exemplary embodiment of the present invention, the polyarylene sulfide prepolymer comprises at least 50% by weight of cyclic polyarylene sulfide, and it comprises preferably 70% by weight or more, more preferably 80% by weight or more, and further preferably 90% by weight or more of cyclic polyarylene sulfide. The upper limit of the cyclic polyarylene sulfide content in the polyarylene sulfide prepolymer is not particularly limited, and it is, for example, 98% by weight or lower, and preferably 95% by weight or lower. In general, a higher weight of cyclic polyarylene sulfide in the polyarylene sulfide prepolymer is preferable in terms of the effects of enhancing fluidity of the molding material.

In an exemplary embodiment of the present invention, the upper limit of the molecular weight of the polyarylene sulfide prepolymer is less than 10,000 in terms of the weight average molecular weight, and it is preferably 5,000 or less, and further preferably 3,000 or less. The lower limit is preferably 300 or more in terms of the weight average molecular weight, it is more preferably 400 or more, and further preferably 500 or more. If the weight average molecular weight is 10,000 or greater, impregnation into the reinforcing fiber bundle may be insufficient, which may in turn result in deteriorated productivity and lowered handleability due to dropping out of the reinforcing fiber bundle from the molding material. The weight average molecular weight can be determined via, for example, size exclusion chromatography (SEC) equipped with a differential refractive index detector.

The melting point of the polyarylene sulfide prepolymer (B) used for the molding material of an exemplary embodiment of the present invention is preferably 100° C. to 250° C., further preferably 130° C. to 230° C., and most preferably 150° C. to 230° C., from the viewpoint of moldability of the molding material.

The melting point within such range enables handling of the prepolymer (B) in a solid form at room temperature and a composite thereof with a bundle of continuous reinforcing fibers (A) can be prepared with the use of conventional impregnation dyes, coaters, filmers (film machines), or the like without the need for severe processing temperature.

An example of cyclic polyarylene sulfide is described in detail with reference to cyclic polyphenylene sulfide, although the present invention is not limited thereto.

The cyclic polyphenylene sulfide compound of an exemplary embodiment of the present invention is the cyclic polyphenylene sulfide compound represented by formula (r) below, and m may be a mixture of 4 to 20:

[Chemical Formula 5]

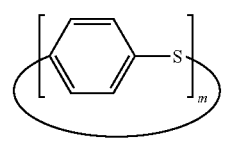

wherein m is an integer of 4 to 20, and m may be a mixture of 4 to 20.

In the formula, the number of repeat unit, m, is an integer of 4 to 20, it is preferably 4 to 15, and further preferably 4 to 12.

The cyclic polyphenylene sulfide simplex having a single "m" is obtained as a crystal, although ease of crystallization differs among cyclic polyphenylene sulfide simplexes having different number of "m." Thus, a melting point tends to be high. In the case of a mixture having different "m," a melting point is significantly lowered, compared with a cyclic polyphenylene sulfide simplex, and a process temperature for melting can be reduced. Also, the cyclic polyphenylene sulfide compound (a mixture having m of 4 to 20) may be incorporated into crystalline resin, so that improved fluidity and crystallization at the time of injection molding can be realized. This indicates that the molded products of an exemplary embodiment of the present invention can be easily obtained at lower temperatures. Since the melting temperature of a cyclic polyphenylene sulfide simplex (i.e., cyclohexa (p-phenylene sulfide) having m of 6 is as high as 348° C., for example, a processing temperature may be elevated to an excessively high level to convert the simplex into a melted state or cyclic polyphenylene sulfide may be dissolved in a solvent, when preparing a composite with a bundle of continuous reinforcing fibers (A).

Because of such features of the cyclic polyphenylene sulfide compound, the cyclic polyphenylene sulfide compounds used in an exemplary embodiment of the present invention are preferably the cyclic polyphenylene sulfide compounds having different number of m, from the viewpoint of productivity thereof, moldability thereof, and improved crystallization characteristics.

The content of cyclic polyphenylene sulfide having m of 6 is preferably less than 50% by weight, relative to the cyclic polyphenylene sulfide compound (a mixture of polyphenylene sulfides having different number of m (i.e., heterogeneous)). It is further preferably less than 10% by weight (i.e., the cyclic polyphenylene sulfide simplex having m of 6 (weight)/the cyclic polyphenylene sulfide compounds (weight)×100). The content of the cyclic polyphenylene sulfide simplex having m of 6 in the cyclic polyphenylene sulfide mixture can be determined in the following manner. That is, the content can be determined as the ratio of the peak area attributable to the cyclic polyphenylene sulfide simplex having m of 6 relative to the whole peak area attributable to a compound having a polyphenylene sulfide structure, when the cyclic polyphenylene sulfide mixture is subjected to high-performance liquid chromatography equipped with a UV detector for component partitioning. The term "compound having a polyphenylene sulfide structure" used herein refers to a compound having at least a phenylene sulfide structure. Examples thereof include the cyclic polyphenylene sulfide compound, linear polyphenylene sulfide, and a compound having a structure other than phenylene sulfide in its part (e.g., at the terminus). The qualities of the peaks partitioned via high-performance liquid chromatography can be analyzed by fractionating the peaks via preparative liquid chromatography and performing absorption spectral analysis via infrared absorption spectroscopy or mass analysis.

The polyarylene sulfide prepolymer can be obtained by, for example, the following method.

(1) A method of heating a mixture comprising at least a polyhalogenated aromatic compound, a sulfidation agent, and an organic polar solvent to generate a polyarylene sulfide resin via polymerization, preparing a mixture comprising granular polyarylene sulfide resin separated through a 80-mesh screen (opening: 0.125 mm), a polyarylene sulfide component generated via polymerization other than the granular polyarylene sulfide resin (such component is referred to as a "polyarylene sulfide oligomer"), an organic polar solvent, water, and alkali metal halide salt, separating and recovering the polyarylene sulfide oligomer contained in such mixture, and subjecting the recovered polyarylene sulfide oligomer to purification to obtain the polyarylene sulfide prepolymer of interest.

(2) A method of heating a mixture comprising at least a polyhalogenated aromatic compound, a sulfidation agent, and an organic polar solvent to generate a polyarylene sulfide resin via polymerization, removing an organic polar solvent by a conventional technique after the completion of polymerization, preparing a mixture comprising polyarylene sulfide resin, water, and alkali metal halide salts, subjecting the mixture to purification via a conventional technique to obtain a polyarylene sulfide resin comprising a polyarylene sulfide prepolymer, and extracting the polyarylene sulfide resin of interest with the use of a solvent that does not substantially dissolve the polyarylene sulfide resin but dissolves the polyarylene sulfide prepolymer to recover the polyarylene sulfide prepolymer of interest.

Polyarylene sulfide (B') used in an exemplary embodiment of the present invention comprises, as a principle constitutional unit, the repeat unit represented by —(Ar—S)—, and it is a homopolymer or copolymer comprising preferably 80% by weight (or mole %) or more, more preferably 90% by weight (or mole %) or more, and further preferably 95% by weight (or mole %) or more of such repeat unit. An example of Ar is a unit represented by any of formulae (b) to (l), and the unit represented by formula (b) is particularly preferable.

As long as polyarylene sulfide (B') comprises such repeat unit as a principle constitutional unit, a minor amount of a branched or crosslinked unit represented by, for example, any of formulae (o) to (q) below can be included. The amount of such branched or crosslinked unit to be copolymerized is preferably 0% to 1% by mole relative to a mole of the —(Ar—S)— unit.

In the present invention, polyarylene sulfide (B') may be a random copolymer, a block copolymer, or a mixture thereof containing such repeat unit.

Representative examples thereof include polyphenylene sulfide, polyphenylene sulfide sulfone, polyphenylene sulfide ketone, polyphenylene sulfide ether, a random or block copolymer thereof, and a mixture thereof. An example of a particularly preferable polyarylene sulfide (B') is polyphenylene sulfide comprising 80% by weight or more, and particularly 90% by weight or more of p-phenylene sulfide unit as a polymer principle constitutional unit represented by formula (it may be occasionally abbreviated as "PPS").

[Chemical Formula 6]

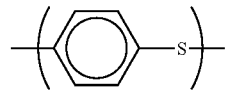

The molecular weight of polyarylene sulfide (B') of an exemplary embodiment of the present invention is 10,000 or more, preferably 15,000 or higher, and more preferably 18,000 or higher, in terms of the weight average molecular weight. If the weight average molecular weight is less than 10,000, a low-molecular-weight component may cause the pyrolysis reaction at the time of molding at higher temperatures (e.g., 360° C.), pyrolysis gas may be generated, and environmental contamination may be caused in the vicinity of molding equipment. The upper limit of the weight average molecular weight is not particularly limited. An example of a preferable range is 1,000,000 or less, more preferably 500, 000 or less, and further preferably 200,000 or less. High molding processability can be attained within such ranges.

In an exemplary embodiment of the present invention, the spread of the polyarylene sulfide (B') molecular weight distribution; i.e., the degree of dispersion represented by the ratio of the weight average molecular weight to the number average molecular weight (i.e., weight average molecular weight/number average molecular weight) is 2.5 or smaller, preferably 2.3 or smaller, more preferably 2.1 or smaller, and further preferably 2.0 or smaller. As the degree of dispersion becomes larger, the amount of a low-molecular-weight component in polyarylene sulfide tends to become larger, which may also cause the environmental contamination in the vicinity of molding equipment. The weight average molecular weight and the number average molecular weight can be determined via, for example, size exclusion chromatography (SEC) equipped with a differential refractive index detector.

In an exemplary embodiment of the present invention, the melt viscosity of polyarylene sulfide (B') is not particularly limited. In general, the melt viscosity of 5 to 10,000 Pa·s (300° C.; shear velocity of 1,000/sec) is a preferable range, for example.

It is preferable that polyarylene sulfide (B') does not substantially contain halogen other than chlorine; i.e., fluorine, bromine, iodine, and astatine. When polyarylene sulfide (B') contains chlorine as halogen, polyarylene sulfide is stable in a general temperature region. Thus, a minor amount of chlorine would not significantly affect dynamic properties of polyarylene sulfide, and gas generated therefrom would not significantly affect a human body. When polyarylene sulfide contains halogens other than chlorine, specific properties thereof may adversely affect the environment. The phrase " . . . does not substantially contain halogen other than chlorine." used herein refers to, for example, the condition in which a polymer is subjected to combustion, a solution that has absorbed the combustion gas is subjected to quantitative analysis via conventional ion chromatography or other means, and the amount of halogens other than chlorine is lower than the lower detection limit. When polyarylene sulfide (B') contains chlorine as halogen, the amount of chlorine is preferably 1% by weight or less, more preferably 0.5% by weight or less, and further preferably 0.2% by weight or less, for the same reasons.

In order to reduce the pyrolysis gas generated at the time of molding, a decrease in the weight of polyarylene sulfide (B') of the present invention when heated preferably satisfies the conditions represented by equation (1) below:

$$\Delta Wr = (W1 - W2)/W1 \times 100 \leq 0.18(\%) \tag{1}$$

wherein $\Delta Wr$ represents a percentage of weight decrease (%), which is determined based on the weight of the sample (W2) at 330° C. relative to the weight of the sample (W1) at 100° C. when performing thermogravimetric analysis under the ordinary pressure and a non-oxidizing atmosphere from 50° C. to arbitrary temperature of 330° C. or higher at a temperature increase rate of 20° C./min.

The value $\Delta Wr$ of polyarylene sulfide (B') of an exemplary embodiment of the present invention is generally 0.18% or less, preferably 0.12% or less, further preferably 0.10% or less, and still further preferably 0.085% or less. When the value $\Delta Wr$ exceeds 0.18%, for example, the amount of gas generated when the fiber-reinforced resin member is heated due to a fire may be disadvantageously large. The value $\Delta Wr$ can be determined via general thermogravimetric analysis, and such analysis is carried out under a non-oxidizing atmosphere at an ordinary pressure. The term "a non-oxidizing atmosphere" refers to an atmosphere that does not substantially include oxygen; that is, an inert gas atmosphere, such as the nitrogen, helium, or argon atmosphere.

The value $\Delta Wr$ is determined via thermogravimetric analysis by increasing a temperature from 50° C. to arbitrary temperature of 330° C. or higher at a temperature increase rate of 20° C./min. The temperature is held at 50° C. for 1 minute and then increased at a temperature increase rate of 20° C./min to perform thermogravimetric analysis.

In general, the degree of weight decrease when thermosetting resin and thermoplastic resin are heated tends to become larger as temperature is raised. It is known that such tendency also applies to polyarylene sulfide. By taking such tendency into consideration, the present inventors thoroughly analyzed the temperature dependency of the weight decrease when polyarylene sulfide (B') and known polyarylene sulfide are heated. As a result, they discovered the correlation between the percentage of weight decrease and temperature, T, represented by equations (2) and (3) below, when the percentage of weight decrease in polyarylene sulfide would be determined based on the thermogravimetric analysis conditions.

$$\Delta Wr1 = \Delta Wt1 - (1.0 \times 10^{-3} \times T1) \tag{2}$$

$$\Delta Wr2 = \Delta Wt2 + (1.0 \times 10^{-3} \times T2) \tag{3}$$

In equation (2), the value $\Delta Wt1$ represents a percentage of weight decrease (%), which is determined by equation (1)' below based on a difference in the weight of the sample (Wt1) at an arbitrary temperature, T1, relative to the weight of the sample (W) at 100° C. when performing thermogravimetric analysis under a non-oxidizing atmosphere at an ordinary pressure by increasing the temperature from 50° C. to arbitrary temperature of higher than 330° C., T1, at a temperature increase rate of 20° C./min.

$$\Delta Wt1 = (W - Wt1)/W \times 100(\%) \tag{1'}$$

As described above, the value, $\Delta Wr$; i.e., the percentage of weight decrease of polyarylene sulfide (B') is determined based on the weight of the sample at 330° C. when performing thermogravimetric analysis. Based on the correlation represented by equation (2), however the value $\Delta Wr$ can be estimated from the percentage of weight decrease, $\Delta Wt1$, based on the weight of the sample at temperature higher than 330° C.

In equation (3), the value $\Delta Wt2$ represents a percentage of weight decrease (%), which is determined by equation (1)" below based on a difference in the weight of the sample (Wt2) at an arbitrary temperature, T2, relative to the weight of the sample (W) at 100° C. when performing thermogravimetric analysis under a non-oxidizing atmosphere at an ordinary pressure by increasing the temperature from 50° C. to arbitrary temperature of 270° C. to lower than 330° C., T2, at a temperature increase rate of 20° C./min.

$$\Delta Wt2 = (W - Wt2)/W \times 100(\%) \tag{1''}$$

As described above, the percentage of weight decrease, $\Delta Wr$, of polyarylene sulfide (B') is determined based on the weight of the sample at 330° C. when performing thermogravimetric analysis. Based on the correlation represented by equation (3), the value $\Delta Wr$ can be estimated from the percentage of weight decrease, $\Delta Wt2$, based on the weight of the sample at temperatures of 270° C. to lower than 330° C. When the upper limit of the temperature of thermogravimetric analysis is lower than 270° C., polyarylene sulfide would not be melted or fluidity tends to be low even if it is melted. Accordingly, such temperature range cannot be suitable for practical usage, and the above-described temperature range is preferably employed as the evaluation standard for polyarylene sulfide quality.

Polyarylene sulfide (B') of the present invention can be produced by heating a polyarylene sulfide prepolymer comprising at least 50% by weight of cyclic polyarylene sulfide represented by formula (a) and having the weight average molecular weight of less than 10,000 to convert the same into a high polymer having the weight average molecular weight of 10,000 or more. According to a more preferable embodiment, a polyarylene sulfide prepolymer comprises 70% by weight or more, further preferably 80% by weight or more, and particularly preferably 90% by weight or more of cyclic polyarylene sulfide. The upper limit of the cyclic polyarylene sulfide content in the polyarylene sulfide prepolymer is not particularly limited. Such content can be, for example, 98% by weight or less, and preferably 95% by weight or less.

As the weight ratio of cyclic polyarylene sulfide increases in the polyarylene sulfide prepolymer, in general, the degree of polyarylene sulfide polymerization tends to be larger after heating. According to the method for producing polyarylene sulfide (B') of an exemplary embodiment of the present invention, specifically, the abundance of cyclic polyarylene sulfide in the polyarylene sulfide prepolymer may be adjusted to regulate the degree of polymerization of the resulting polyarylene sulfide, and the amount of gas generated at the time of heating can further be reduced. Thus, the method is preferable.

Accordingly, a composite of a bundle of continuous reinforcing fibers (A) and polyarylene sulfide (B') can be prepared by, for example, the following methods: (I) a method wherein a polyarylene sulfide prepolymer is allowed to impregnate into a bundle of continuous reinforcing fibers in advance to convert the polyarylene sulfide prepolymer into a high polymer of polyarylene sulfide via heating; (II) a method wherein a polyarylene sulfide prepolymer is heated for polymerization and simultaneously allowed to impregnate into a bundle of continuous reinforcing fibers; or (III) a method wherein a polyarylene sulfide prepolymer is heated to convert the same into a high polymer of polyarylene sulfide and the resultant is then allowed to impregnate into a bundle of continuous reinforcing fibers. From the viewpoint of economic efficiency and productivity at the time of molding material production, the method (I) is preferable.

Examples of methods for obtaining the polyarylene sulfide prepolymer include the methods (1) and (2) for producing a polyarylene sulfide prepolymer described above.

Known thermoplastic resin can be used as the thermoplastic resin (C) without particular limitation. Specifically, polyester resins, such as polyethylene terephthalate (PET) resin, polybutylene terephthalate (PBT) resin, polytrimethylene terephthalate (PTT) resin, polyethylene naphthalate (PENp) resin, and liquid crystal polyester, polyolefin resins, such as polyethylene (PE) resin, polypropylene (PP) resin, and polybutylene resin, styrene resin, urethane resin, polyoxymethylene (POM) resin, polyamide (PA) resin, polycarbonate (PC) resin, polymethyl methacrylate (PMMA) resin, polyvinyl chloride (PVC) resin, polyphenylene sulfide (PPS) resin, polyphenylene ether (PPE) resin, denatured PPE resin, polyimide (PI) resin, polyamide imide (PAI) resin, polyetherimide (PEI) resin, polysulfone (PSU) resin, denatured PSU resin, polyethersulfone (PES) resin, polyketone (PK) resin, polyether ketone (PEK) resin, polyether ether ketone (PEEK) resin, polyether ether ketone ketone (PEKK) resin, polyalylate (PAR) resin, polyether nitrile (PEN) resin, phenolic resin, phenoxy resin, fluorine resins, such as polytetrafluoroethylene, resins of copolymers of any thereof, resins of denatured forms thereof, or resin blends of two or more of any can be used.

Among the above thermoplastic resins, when the polyarylene sulfide prepolymer (B) is used as component (ii), the polyarylene sulfide prepolymer (B) component would more significantly improve fluidity at the time of molding. Thus, crystalline resin is preferable. Further, the melting point of crystalline resin is more preferably 120° C. or higher, and particularly preferably 180° C. or higher. The term "melting point" used herein refers to an endothermic peak temperature observed via differential calorimetry in the following manner. That is, crystalline resin is subjected to differential calorimetry at a temperature increase rate of 20° C./min to observe the endothermic peak temperature (Tm), the temperature is held at 320° C. for 1 minute, cooled to 100° C. at a temperature decrease rate of 20° C./min, held for 1 minute, and then measured at a temperature increase rate of 20° C./min again. Specific examples include polyamide resin, polyester resin, and polyphenylene sulfide resin.

When the polyarylene sulfide prepolymer (B) is used as component (ii), the molecular weight of the thermoplastic resin (C) is preferably 10,000 or higher, more preferably 20,000 or higher, and particularly preferably 30,000 or higher, in terms of the weight average molecular weight, from the viewpoint of dynamic properties of the molded product resulting from molding of the molding material. This indicates that a greater weight average molecular weight is more advantageous because of enhanced strength or ductility of the matrix resin. The upper limit of the weight average molecular weight is not particularly limited. From the viewpoint of fluidity at the time of molding, the upper limit is preferably 1,000,000 or lower, and more preferably 500,000 or lower. The weight average molecular weight can be determined via gel permeation chromatography (GPC) known to the public, such as size exclusion chromatography (SEC) described above.

When polyarylene sulfide (B') is used as component (ii), a resin that is excellent in terms of thermoresistance may be preferably selected from among the aforementioned thermoplastic resins in order to further enhance the effects of the present invention. Examples of thermoresistant resin include crystalline resin having a melting point of 200° C. or higher, preferably 220° C. or higher, more preferably 240° C. or higher, and further preferably 260° C. or higher and noncrystalline resins having a deflection temperature under load of 120° C. or higher, preferably 140° C. or higher, more preferably 160° C. or higher, and further preferably 180° C. or higher. Accordingly, examples of preferable resins include polyamide resin, polyimide resin, polyamide imide resin, polyetherimide resin, polyether ketone resin, polyether ether ketone resin, polyether ketone ketone resin, polyether sulfone resin, and PPS resin. Further, polyamide resin, polyetherimide resin, polyamide imide resin, polyether ether ketone resin, and polyphenylene sulfide resin can be exemplified as preferable resins. When thermoplastic resin (C) is PPS resin, polyarylene sulfide resin that is identical to or different from component (B') may be used. Use of PPS resin having a molecular weight higher than that of component (B') is preferable.

The thermoplastic resin compositions exemplified above (i.e., component (C)) may comprise a fiber-reinforcing agent, an agent for improving impact resistance such as elastomer or rubber components, and other fillers or additives within the scope of the present invention. Examples thereof include an inorganic filler, a flame retardant, a conductivity imparting agent, a crystal nucleating agent, an ultraviolet absorber, an antioxidant, a damping agent, an antibacterial agent, an insect repellent, a deodorant, a coloring inhibitor, a thermal stabilizer, a release agent, an antistatic agent, a plasticizer, a lubricant, a coloring agent, a pigment, a dye, a foaming agent, an anti-foaming agent, and a coupling agent.

The molding material of an exemplary embodiment of the present invention is constituted by a reinforcing fiber bundle (A), a polyarylene sulfide prepolymer (B) or polyarylene sulfide (B'), and a thermoplastic resin (C), and the sum of such constituents is 100% by weight.

The amount of the reinforcing fiber bundle (A) is 1 to 50% by weight, preferably 5 to 45% by weight, and more preferably 10 to 40% by weight. When the amount of the reinforcing fiber bundle (A) is less than 1% by weight, dynamic properties of the resulting molded product may be insufficient. When the amount thereof exceeds 50% by weight, fluidity may be lowered at the time of injection molding.

The amount of the polyarylene sulfide prepolymer (B) or polyarylene sulfide (B') is 0.1 to 10% by weight, preferably 0.5 to 8% by weight, and more preferably 1 to 6% by weight. When the amount of the polyarylene sulfide prepolymer (B) is less than 0.1% by weight, moldability and handleability of the molding material may be insufficient. When the amount thereof exceeds 10% by weight, a large amount of gas may be generated at the time of injection molding, voids may remain in the molded product, and dynamic properties may be deteriorated. When the amount of polyarylene sulfide (B') is less than 0.1% by weight, moldability of the molding material; i.e., dispersion of reinforcing fiber at the time of molding, may be insufficient. When the amount thereof exceeds 10% by weight, dynamic properties of the matrix resin (i.e., a thermoplastic resin) may be deteriorated.

Further, the amount of the thermoplastic resin (C) is 40 to 98.9% by weight, preferably 47 to 94.5% by weight, and more preferably 54 to 89% by weight. The use thereof within such range can yield the preferred effects of the present invention.

The molding material of an exemplary embodiment of the present invention comprises the composite of a bundle of continuous reinforcing fibers (A) and the polyarylene sulfide prepolymer (B) or polyarylene sulfide (B'), and the thermoplastic resin (C) adhered thereto.

A composite is constituted by the reinforcing fiber bundle (A) and the polyarylene sulfide prepolymer (B) or polyarylene sulfide (B'). A configuration of the composite is as shown in FIG. 1, and the polyarylene sulfide prepolymer (B) fills the space between monofilaments of the reinforcing fiber bundle (A). That is, reinforcing fibers (A) are dispersed in the form of islands in the ocean of the polyarylene sulfide prepolymer (B). When the polyarylene sulfide prepolymer (B) is used as component (ii), specifically, the polyarylene sulfide prepolymer (B) is heat-melted and then allowed to impregnate into the reinforcing fiber bundle (A) to form a composite. Specific construction of the composite when the polyarylene sulfide (B') is used as component (ii) is as described above.

The molding material of an exemplary embodiment of the present invention is constructed as a composite of a reinforcing fiber bundle (A) that is satisfactorily impregnated with the polyarylene sulfide prepolymer (B) having good fluidity and excellent impregnation properties or polyarylene sulfide (B') having excellent thermoresistance and low gas properties. Even if the thermoplastic resin (C) is adhered to the composite, for example, upon injection molding of the molding material, the polyarylene sulfide prepolymer (B) or polyarylene sulfide (B') that has been melted and kneaded in the cylinder of the injection mold and has good fluidity is dispersed in the thermoplastic resin (C), and it plays a role of a so-called impregnation/dispersion aid, which assists the reinforcing fiber bundle (A) to be dispersed in the thermoplastic resin (C) and simultaneously assists the thermoplastic resin (C) to be substituted and impregnated into the reinforcing fiber bundle (A).

Figure 2:
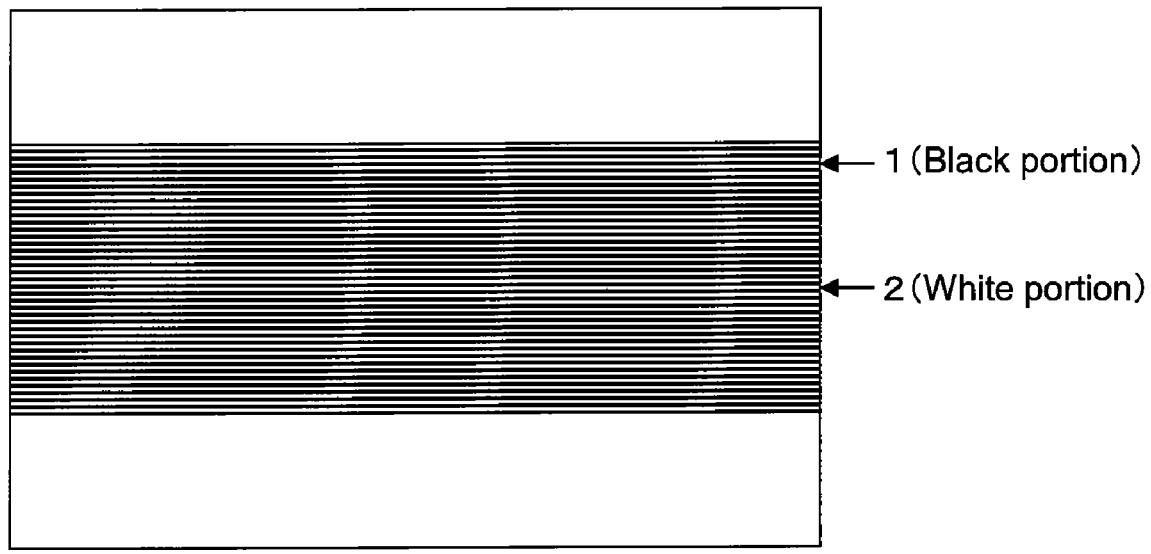
FIG. 2 schematically shows a preferable embodiment of the molding material of the present invention.

According to a preferable embodiment of the molding material of the present invention, as shown in FIG. 2, a reinforcing fiber bundle (A) is aligned substantially parallel to the shaft center of the molding material and the length of the reinforcing fiber bundle (A) is substantially the same as that of the molding material.

The term "aligned substantially parallel to" used herein refers to the conditions such that the major axis of the reinforcing fiber bundle and that of the molding material are aligned in the same direction. A difference in angles between axes is preferably 20° or smaller, more preferably 10° or smaller, and further preferably 5° or smaller. The phrase "the length . . . is substantially the same . . ." refers to the conditions, such that a reinforcing fiber bundle is not broken in the middle of the pellet-like molding material, or the molding material does not substantially contain a reinforcing fiber bundle that is significantly shorter than the full-length of the pellet. The amount of the reinforcing fiber bundle that is significantly shorter than the full-length of the pellet is not particularly defined. When the content of the reinforcing fiber that is a half or shorter the full-length pellet is 30% by weight or less, the molding material is evaluated as substantially containing no reinforcing fiber bundle that is significantly shorter than the full-length of the pellet. Further, the content of the reinforcing fiber that is a half or shorter the full-length pellet is preferably 20% by weight or less. The term "full-length of the pellet" refers to the length of the reinforcing fiber in the pellet. If the length of the reinforcing fiber bundle (A) is equivalent to that of the molding material, the reinforcing fiber in the molded product can be longer. Thus, the molded product can have excellent dynamic properties.

FIGS. 3 to 6 schematically show examples of configurations of the cross section in the axis direction of the molding material of an exemplary embodiment of the present invention. FIGS. 7 to 10 schematically show examples of configurations of the cross section in the orthogonal direction of the molding material of an exemplary embodiment of the present invention.

Figure 3:
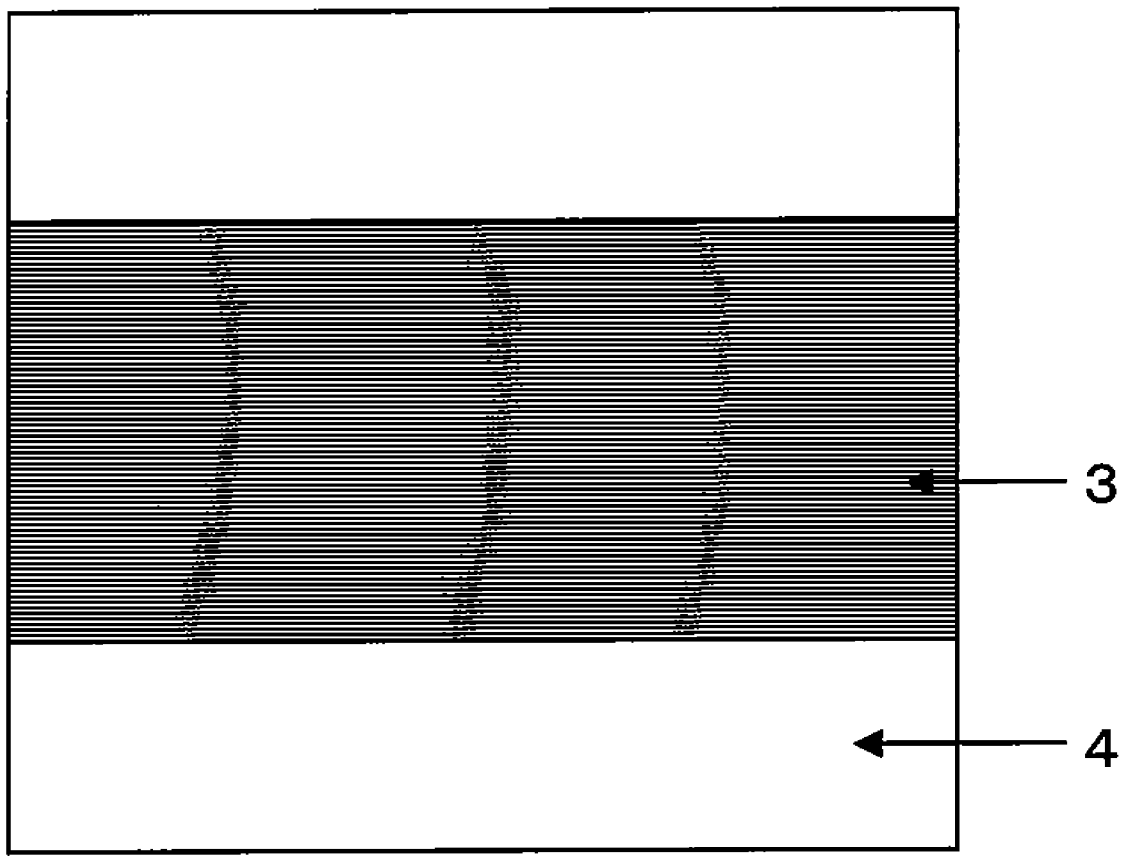
FIG. 3 schematically shows an example of a cross sectional configuration of the molding material according to a preferable embodiment of the present invention in an axial direction.
Figure 4:
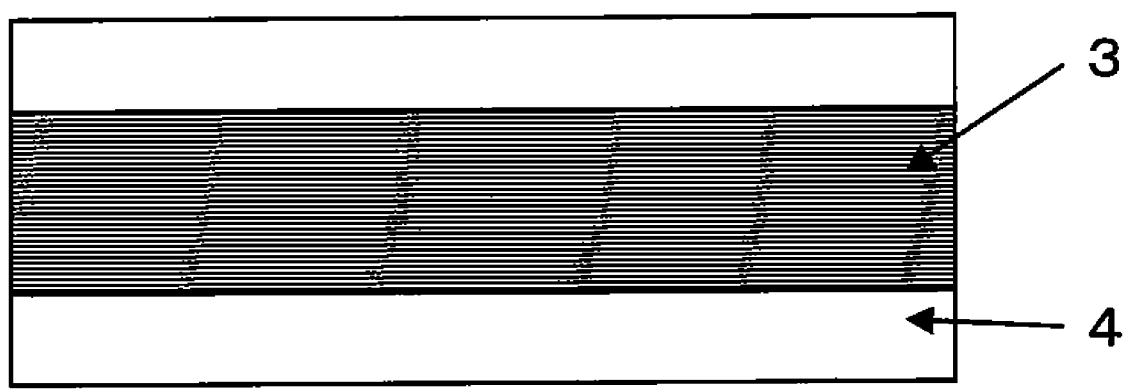
FIG. 4 schematically shows an example of a cross sectional configuration of the molding material according to a preferable embodiment of the present invention in an axial direction.
Figure 5:
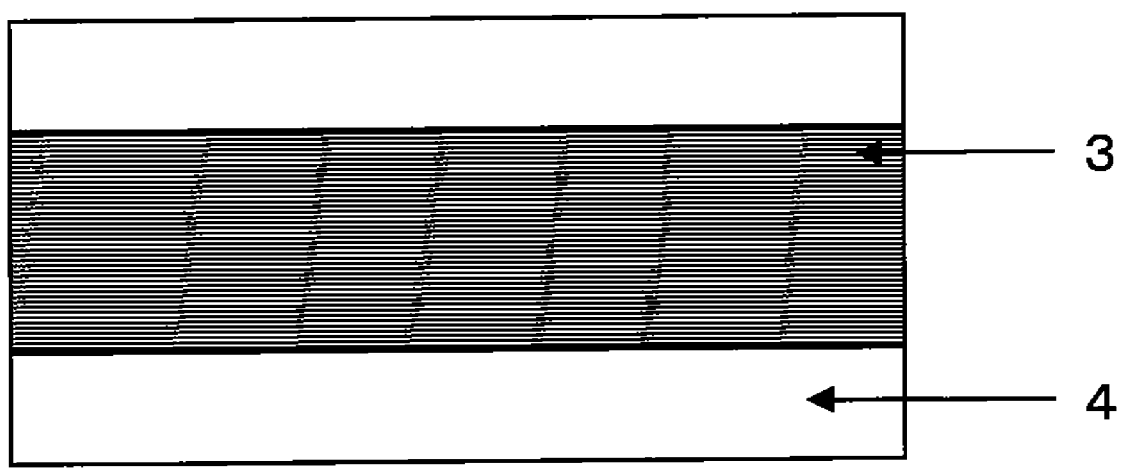
FIG. 5 schematically shows an example of a cross sectional configuration of the molding material according to a preferable embodiment of the present invention in an axial direction.
Figure 6:
FIG. 6 schematically shows an example of a cross sectional configuration of the molding material according to a preferable embodiment of the present invention in an axial direction.

The configuration of the cross section of the molding material is not limited to the configuration shown in the figures, provided that the thermoplastic resin (C) is adhered to the composite of the reinforcing fiber bundle (A) and the polyarylene sulfide prepolymer (B) or polyarylene sulfide (B'). A construction such that the composite serves as the core that is sandwiched by the thermoplastic resin (C) is preferable, as shown in FIGS. 3 to 5 showing the cross section in the axis direction.

Figure 7:
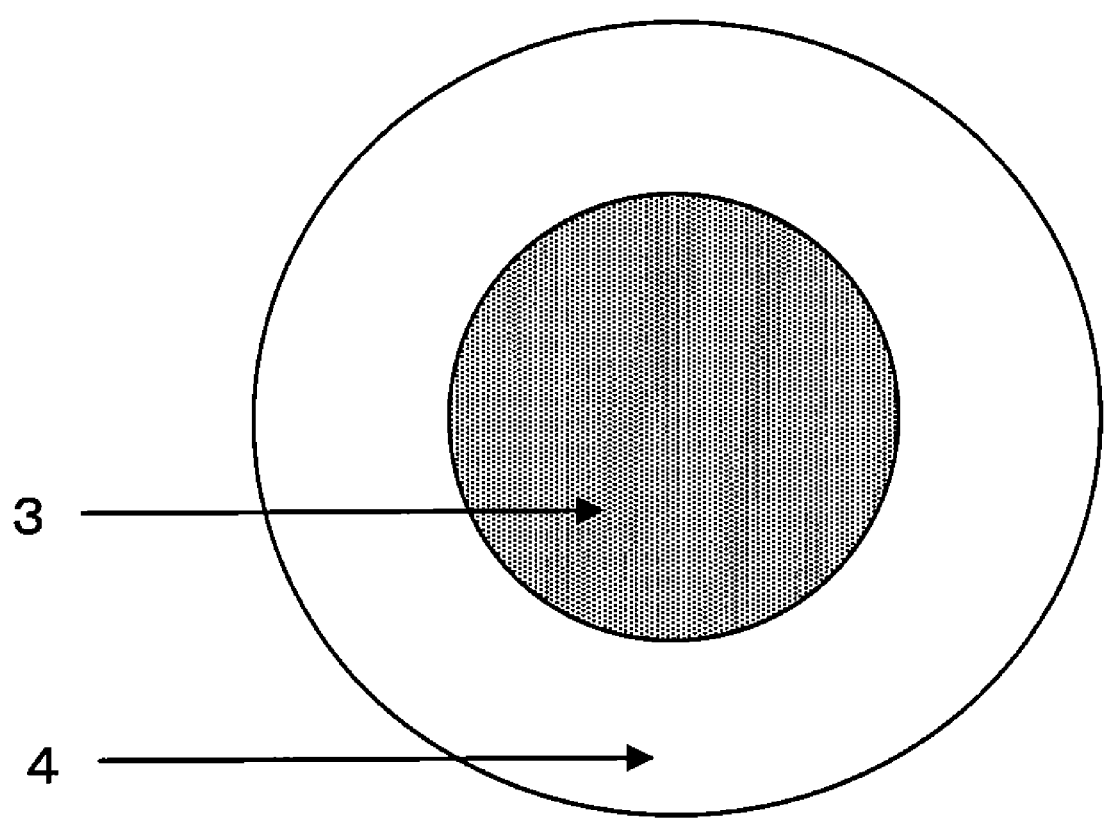
FIG. 7 schematically shows an example of a cross sectional configuration of the molding material according to a preferable embodiment of the present invention in an orthogonal direction.
Figure 8:
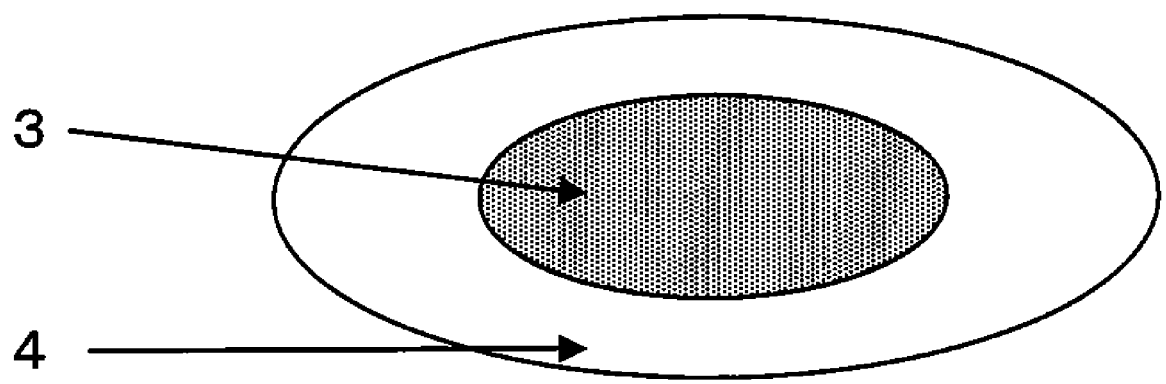
FIG. 8 schematically shows an example of a cross sectional configuration of the molding material according to a preferable embodiment of the present invention in an orthogonal direction.
Figure 9:
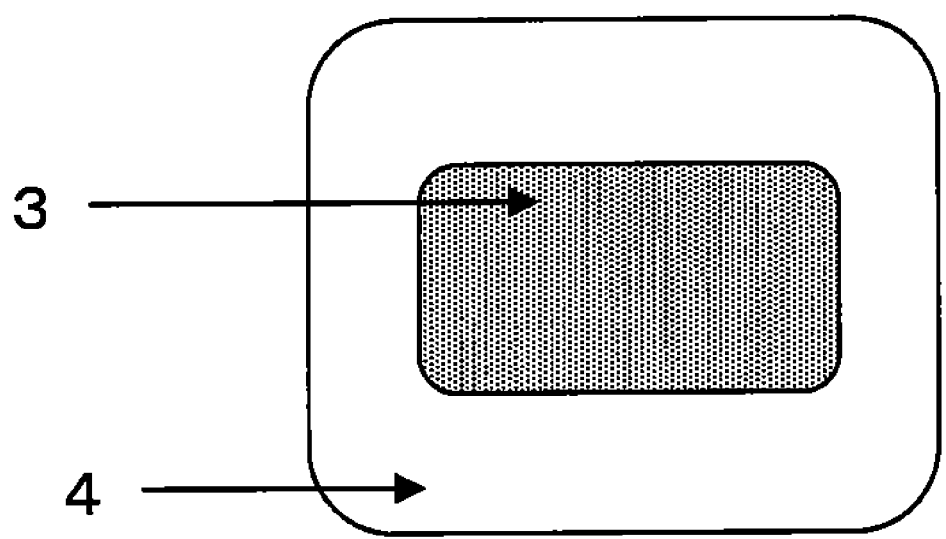
FIG. 9 schematically shows an example of a cross sectional configuration of the molding material according to a preferable embodiment of the present invention in an orthogonal direction.
Figure 10:
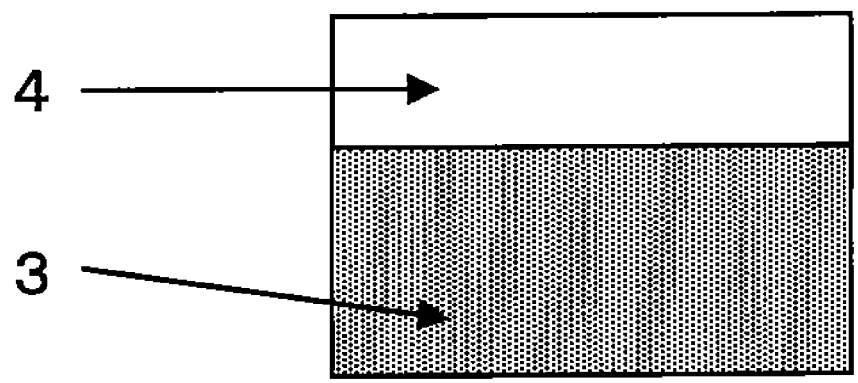
FIG. 10 schematically shows an example of a cross sectional configuration of the molding material according to a preferable embodiment of the present invention in an orthogonal direction.
Figure 11:
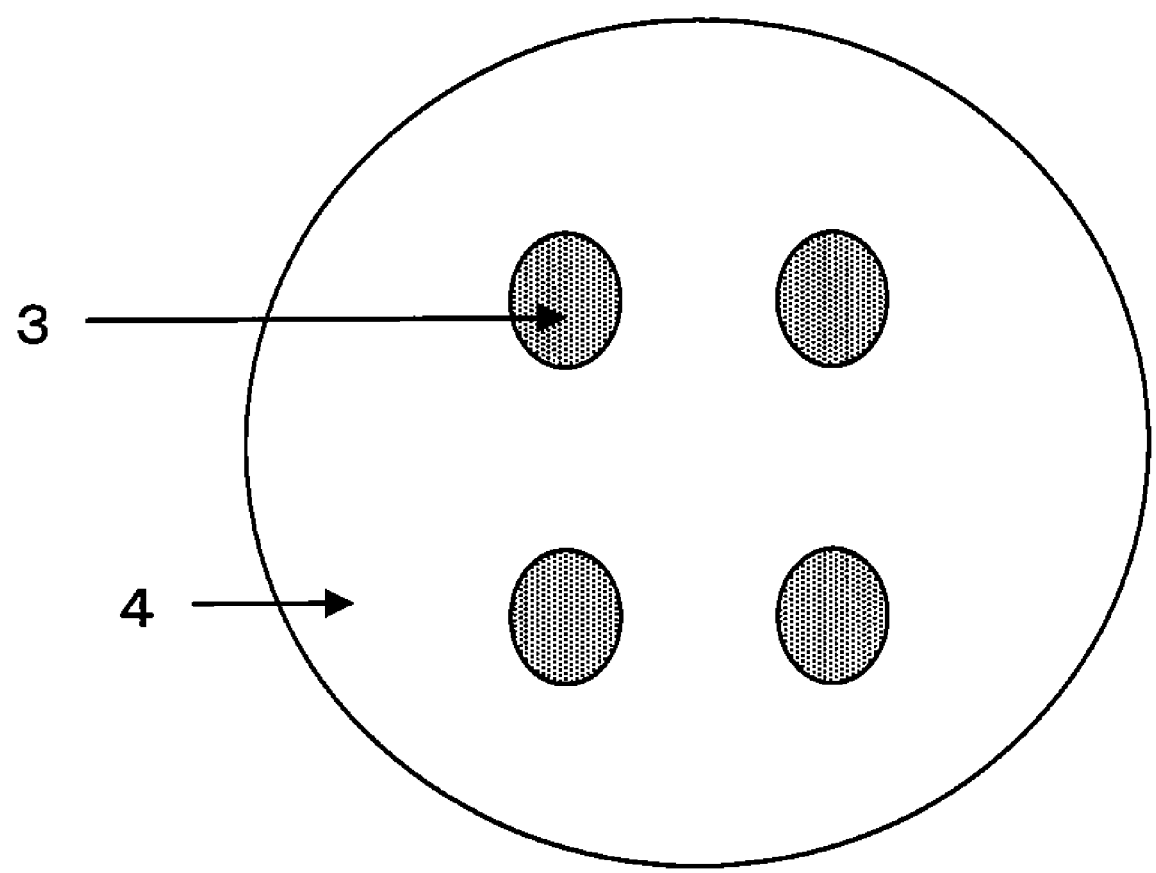
FIG. 11 schematically shows an example of a cross sectional configuration of the molding material according to a preferable embodiment of the present invention in an orthogonal direction.

Also, a core-in-sheath type structure such that the composite serves as the core that is surrounded by the thermoplastic resin (C) is preferable, as shown in FIGS. 7 to 9 showing the cross section in the orthogonal direction. When a plurality of composites are covered by the thermoplastic resin (C) as shown in FIG. 11, the number of composites is preferably about 2 to 6.

Alternatively, the composite is adhered to the thermoplastic resin (C), the thermoplastic resin (C) partially impregnates into part of the composite at around the boundary therebetween, and the thermoplastic resin (C) may be compatible with the polyarylene sulfide prepolymer (B) or polyarylene sulfide (B') in the composite or the thermoplastic resin (C) may impregnate into the reinforcing fiber.

The axis direction of the molding material is not particularly limited, provided that it maintains substantially the same cross sectional configuration and it is continuous. Such continuous molding material may be cut into a certain length in accordance with a molding technique.

The molding material of the present invention may be subjected to, for example, injection molding, press molding, or other techniques to blend the thermoplastic resin (C) with the composite comprising the reinforcing fiber bundle (A) and the polyarylene sulfide prepolymer (B) or polyarylene sulfide (B'), and the final molded product can be produced. From the viewpoint of handleability of the molding material, it is important that the thermoplastic resin (C) is not separated from the composite until molding is performed and the configuration as described above is maintained.

When the polyarylene sulfide prepolymer (B) is used as component (ii), the polyarylene sulfide prepolymer (B) is often a solid that is generally relatively fragile and is easily broken at room temperature because of its low molecular weight. Thus, the thermoplastic resin (C) is preferably disposed so as to protect the composite, so that the polyarylene sulfide prepolymer (B) would not be broken and scattered because of material transportation, impact at the time of handling, abrasion, and other factors until molding.

To this end, as shown in FIGS. 7 to 9, the thermoplastic resin (C) is preferably disposed so as to surround the composite of a reinforcing fiber bundle (A) as the reinforcing fiber and the polyarylene sulfide prepolymer (B). That is, a core-in-sheath type structure such that the composite of a reinforcing fiber bundle (A) as the reinforcing fiber and the polyarylene sulfide prepolymer (B) constitutes a core and the thermoplastic resin (C) surrounds the composite is preferable.

With such construction, a high-molecular-weight thermoplastic resin (C) wraps the polyarylene sulfide prepolymer (B) that is easily broken or the thermoplastic resin (C) is disposed on a surface that is easily abraded. Thus, a configuration of the molding material can be easily maintained. Regarding the construction such that the thermoplastic resin (C) is disposed so as to surround the composite of the reinforcing fiber bundle (A) and the polyarylene sulfide prepolymer (B) and the construction such that the composite and the thermoplastic resin (C) are disposed in layers, the former construction is more advantageous from the viewpoint of ease of production and handleability of materials.

When polyarylene sulfide (B') is used as component (ii), the composite and the thermoplastic resin (C) have completely different configurations (i.e., size and aspect ratio), specific gravity, and weight. This may cause classifications in materials at the time of transportation, handling, and molding, which may in turn cause variations in dynamic properties of the molded products, lower fluidity, clog the mold, and block the mold at the time of molding.

Thus, as shown in FIGS. 7 to 9, thermoplastic resin (C) is preferably disposed so as to surround the composite of the reinforcing fiber bundle (A) as the reinforcing fiber and polyarylene sulfide (B'); i.e., a core-in-sheath type structure such that the composite of a reinforcing fiber bundle (A) as the reinforcing fiber and the polyarylene sulfide prepolymer (B) constitutes a core and the thermoplastic resin (C) surrounds the composite is preferable. With such construction, the composite can be more firmly combined with the thermoplastic resin (C). Regarding the construction such that the thermoplastic resin (C) is disposed so as to surround the composite of the reinforcing fiber bundle (A) and polyarylene sulfide (B') and the construction such that the composite and the thermoplastic resin (C) are disposed in layers, the former construction is more advantageous from the viewpoint of ease of production and handleability of materials.

As described above, it is preferable that the reinforcing fiber bundle (A) be completely impregnated with the polyarylene sulfide prepolymer (B) or polyarylene sulfide (B'), although it is practically difficult. Some voids are present in the composite of the reinforcing fiber bundle (A) and the polyarylene sulfide prepolymer (B) or polyarylene sulfide (B'). When a reinforcing fiber content is particularly large, many voids are generated. Even when some voids are present, the effects of accelerating impregnation and fiber dispersion are attained. When a void percentage exceeds 40%, however, the effects of accelerating impregnation and fiber dispersion are significantly lowered. Thus, the void percentage is preferably between 0% and 40%, and more preferably 20% or lower. The void percentage is determined by subjecting the relevant part of the composite to the ASTM D2734 test method (1997).

The molding material is preferably cut into a length of 1 to 50 mm. By adjusting the length within such range, fluidity and handleability at the time of molding can be sufficiently improved. A particularly preferable embodiment of the molding material that is cut into an adequate length is a long-fiber pellet used for injection molding.

The molding material may be used in a continuous or long form depending on a molding technique. For example, the molding material may be wound around the mandrel as a thermoplastic yarn prepreg with heating to obtain a roll molded product. An example of such molded product is a liquefied natural gas tank. A plurality of the molding materials may be unidirectionally aligned and heat-fused in order to prepare a unidirectional thermoplastic prepreg. A prepreg comprising, as component (ii), the polyarylene sulfide prepolymer (B) can be applied in the fields that require high strength, high elastic modulus, and impact resistance, such as aircraft members. A prepreg comprising, as component (ii), the polyarylene sulfide (B') can be applied in the fields that require thermoresistance, high strength, high elastic modulus, and impact resistance, such as aircraft members.

The molding material can be processed in the final form of a product via conventional molding techniques. Examples of molding techniques include press molding, transfer molding, injection molding, and combination of any thereof. Examples of molded products include: automobile parts, such as a cylinder head cover, a bearing retainer, an intake manifold, and a pedal; tools, such as a monkey wrench; and small articles, such as a gear. Because of excellent fluidity, the molding material can relatively easily produce a thin-walled molded product having a thickness of 0.5 mm to 2 mm. Examples of products that require such thin-wall molding include: housings used for personal computers or cell-phones; and members used for electric/electronic equipment as typified by a keyboard support, which is a member that supports a keyboard inside a personal computer. Such members used for electric/electronic equipment are more preferable because electromagnetic shielding properties are imparted when a conductive carbon fiber is used as a reinforcing fiber.

The above molding material can be used as a pellet for injection molding. When performing injection molding, temperature, pressure, and kneading are applied when plasticizing a pelletized molding material. According to an exemplary embodiment of the present invention, the polyarylene sulfide prepolymer (B) or polyarylene sulfide (B') exhibits remarkable effects as a dispersion/impregnation aid. In such a case, a conventional in-line screw-type injection molding machine can be used. Even if the kneading effects provided by a screw are weak due to the use of a screw having a low compression or a low back pressure at the time of material plasticization, reinforcing fibers can be satisfactorily dispersed in the matrix resin, and a molded product that has realized satisfactory impregnation of fiber with resin can be obtained.

The prepreg of an exemplary embodiment of the present invention comprises a resin composition comprising at least 50% by weight of cyclic polyarylene sulfide and a polyarylene sulfide prepolymer having the weight average molecular weight of less than 10,000 impregnated into the reinforcing fiber.

In an exemplary embodiment of the present invention, cyclic polyarylene sulfide is a cyclic compound comprising, as a principle constitutional unit, a repeat unit represented by formula: —(Ar—S)— (wherein Ar represents an arylene group), and it is a compound as represented by formula (a) above comprising preferably 80% by weight (or mole %) or more, more preferably 90% by weight (or mole %) or more, and further preferably 95% by weight (or mole %) or more of such repeat unit. Ar is, for example, a unit represented by any of formulae (b) to (l), and the unit represented by formula (b) is particularly preferable because of excellent properties, such as elastic modulus, thermoresistance, or flameproofness of the fiber-reinforced composite material that is obtained with the use of the prepreg.

Cyclic polyarylene sulfide may comprise the repeat unit represented by any of formulae (b) to (l) at random or as a block or a mixture thereof. Representative examples include a cyclic homopolymer or copolymer comprising the repeat unit represented by any of formulae (b), (c), (g) to (l), a cyclic polyphenylene sulfide sulfone (formula (e)), cyclic polyphenylene sulfide ketone (formula (d)), cyclic polyphenylene sulfide ether (formula (O), a cyclic random copolymer or cyclic block copolymer comprising any thereof, and a mixture of any thereof. An example of particularly preferable cyclic polyarylene sulfide is cyclic polyphenylene sulfide (hereafter it may be abbreviated as "cyclic PPS") comprising, as the principle constitutional unit, 80% by weight (or mole %) or more, and particularly 90% by weight (or mole %) or more of the p-phenylene sulfide unit represented by the following formula.

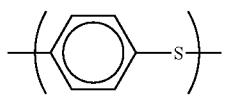

Such unit is preferable because of excellent properties such as elastic modulus or thermoresistance of the fiber-reinforced composite material that is obtained with the use of the prepreg. The weight percentage is relative to the weight of cyclic polyarylene sulfide.

The number of repeat units, m, in formula (a) of cyclic polyarylene sulfide is not particularly limited, and such number is preferably 2 to 50, more preferably 2 to 25, and most preferably 3 to 20. As m becomes larger, the molecular weight relatively becomes larger. If m exceeds 50, accordingly, the melting temperature and viscosity at the time of melting of cyclic polyarylene sulfide may be elevated depending on an Ar type. This may occasionally complicate impregnation of the reinforcing fiber substrate with resin.

Cyclic polyarylene sulfide may be a single compound having a single number of repeat unit or a mixture of cyclic polyarylene sulfides having different number of repeat units. The mixture of cyclic polyarylene sulfides having different number of repeat units tends to have a lower dissolving or melting temperature than the single compound having a single number of repeat unit. This facilitates impregnation of the reinforcing fiber substrate and the mixture is thus more preferable.

In an exemplary embodiment of the present invention, a component other than cyclic polyarylene sulfide in the polyarylene sulfide prepolymer is particularly preferably the linear polyarylene sulfide oligomer because of excellent properties, such as elastic modulus or thermoresistance, of the fiber-reinforced composite material obtained with the use of the prepreg. The term "linear polyarylene sulfide oligomer" used herein refers to a homooligomer or cooligomer comprising, as the principle constitutional unit, the repeat unit represented by formula: —(Ar—S)—, in an amount of 80% by weight (or mole %) or more, preferably 90% by weight (or mole %) or more, and further preferably 95% by weight (or mole %) or more. Examples of Ar include units represented by formulae (b) to (l), and the unit represented by formula (b) is particularly preferable. The linear polyarylene sulfide oligomer can comprise a minor amount of a branched or crosslinked unit represented by any of formulae (o) to (q), provided that the oligomer comprises, as the principle constitutional unit, such repeat unit. The amount of such branched or crosslinked unit to be copolymerized is preferably 0 to 1 mole % relative to a mole of the unit represented by —(Ar—S)— because of excellent impregnation into the reinforcing fiber substrate, in addition to excellent properties, such as elastic modulus or thermoresistance, of the fiber-reinforced composite material obtained with the use of the prepreg. The linear polyarylene sulfide oligomer may be a random copolymer or block copolymer comprising the repeat unit or a mixture thereof.

Representative examples of such linear polyarylene sulfide oligomer include a polyphenylene sulfide oligomer, a polyphenylene sulfide sulfone oligomer, a polyphenylene sulfide ketone oligomer, a polyphenylene sulfide ether oligomer, a random copolymer or block copolymer of any thereof, and a mixture of any thereof. A particularly preferable linear polyarylene sulfide oligomer is, for example, a linear polyphenylene sulfide oligomer comprising, as the polymer principle constitutional unit, the p-phenylene sulfide unit in amounts of 80% by weight (or mole %) or more, and particularly preferably 90% by weight (or mole %) or more because of excellent impregnation into the reinforcing fiber substrate, in addition to excellent properties, such as elastic modulus or thermoresistance, of the fiber-reinforced composite material obtained with the use of the prepreg.

The polyarylene sulfide prepolymer of an exemplary embodiment of the present invention comprises at least 50% by weight, preferably 70% by weight or more, more preferably 80% by weight or more, and further preferably 90% by weight or more of cyclic polyarylene sulfide. The upper limit of the cyclic polyarylene sulfide content in the polyarylene sulfide prepolymer is not particularly limited, and such content is most preferably 100% by weight. As the weight ratio of cyclic polyarylene sulfide in the polyarylene sulfide prepolymer increases, in general, mechanical properties, such as flexural strength or interlayer shear strength of the fiber-reinforced composite material, are improved. Although the reason therefor has not yet been elucidated, the degree of polymerization of the polymer tends to be elevated after polymerization as the weight ratio of cyclic polyarylene sulfide increases, and this is considered to be related.

The upper limit of the molecular weight of the polyarylene sulfide prepolymer is lower than 10,000, preferably 5,000 or lower, and further preferably 3,000 or lower, in terms of the weight average molecular weight. The lower limit is preferably 300 or more, more preferably 400 or more, and further preferably 500 or more, in terms of the weight average molecular weight. If the weight average molecular weight is 10,000 or greater, the viscosity of the resin composition is increased, impregnation of resin into the reinforcing fiber substrate becomes insufficient, and, further, dynamic properties, in particular, interlayer shear strength of the fiber-reinforced composite material laminate resulting from molding thereof are deteriorated. The reason for the deteriorated interlayer shear strength is not exactly known; however, it is considered as follows: an excessively large weight average molecular weight results in a reduced reaction at the time of lamination, polymer chains between layers decrease, and the interlayer shear strength is thus deteriorated. If the weight average molecular weight is 300 or lower, mechanical properties or the like may become insufficient after polymerization due to an insufficient degree of polymerization.

The polyarylene sulfide prepolymer can be obtained by, for example, the methods for producing a polyarylene sulfide prepolymer (1) and (2) described above.

The resin composition may comprise components other than the polyarylene sulfide prepolymer. Components other than the polyarylene sulfide prepolymer are not particularly limited, and various thermoplastic resin polymers, oligomers, various thermosetting resins, and various additives, such as inorganic fillers, compatibilizers, antioxidants, thermal stabilizers, ultraviolet absorbers, flame retardants, coloring agents, or adhesives may be incorporated.

Specific examples of thermoplastic resins include linear or cyclic polymers and oligomers of polyethylene, polyamide, polyester, polystyrene, polycarbonate, polyphenylene oxide, polyimide, polyamide imide, polyether ketone, polyvinyl formal, polyvinyl acetal, polysulfone, and polyether sulfone.

Specific examples of thermosetting resins include unsaturated polyester resin, vinyl ester resin, and epoxy resin.

In order to facilitate lamination of prepregs, a tackifier is preferably added to the resin composition. As a tackifier, a compound having a polar group in its molecule, whose softening temperature is 150° C., is preferably used. The term "softening temperature" refers to the Vicat softening temperature in accordance with JIS K7206-1999. A substance whose softening temperature is 150° C. or lower has a relatively small molecular weight, and fluidity thereof is good. Thus, stickiness at the time of prepreg lamination is improved, a substance having in its molecule a polar group induces a weak bond, such as a hydrogen bond, and stickiness at the time of prepreg lamination is improved. Thus, such substance is preferable. Specifically, an ethylene-ethyl acrylate copolymer, an ethylene-vinyl acrylate copolymer, a terpene polymer, a terpene phenol copolymer, a polyurethane elastomer, acrylonitrile butadiene rubber (NBR), and the like are preferably used.

The prepreg comprises a reinforcing fiber impregnated with the aforementioned resin composition.

In the present invention, the reinforcing fiber is not particularly limited, carbon fiber, glass fiber, aramid fiber, boron fiber, alumina fiber, silicon carbide fiber, and the like can be used, and two or more types of such fibers can be used in combination. Among them, use of carbon fiber is preferable in order to obtain a molded product having light weight, high strength, and high elastic modulus. Use of carbon fiber having a tensile elastic modulus of 200 to 700 Gpa is particularly preferable.

In the present invention, configurations and alignments of the reinforcing fibers can be, for example, unidirectionally aligned fibers, woven fabrics (cloths), knitted goods, braided ropes, tows, and mats. Use of unidirectionally aligned fibers is particularly preferable because strength properties can be easily designed depending on a lamination structure, and use of woven fabrics is preferable because it can be easily shaped into a curved configuration.

In the present invention, the weight content of the reinforcing fiber in the prepreg is not particularly limited. By impregnating the fiber with a resin composition comprising at least 50% by weight of cyclic polyarylene sulfide, the weight content of the reinforcing fiber in the prepreg can be increased. From the viewpoint of the balance between mechanical properties and moldability, the weight content is preferably 40 to 90% by weight, more preferably 50 to 85% by weight, and particularly preferably 60 to 80% by weight. When the weight content is less than 40% by weight, mechanical properties such as flexural strength would be insufficient. When the weight content exceeds 90% by weight, it would be difficult to impregnate the reinforcing fiber with the resin composition.

The weight content of the reinforcing fiber can be determined by eluting the resin from the prepreg with the aid of an organic solvent or the like and measuring the weight of the fiber.

The prepreg of the present invention can be produced by, for example, the wet method comprising dissolving or dispersing the resin composition in a solvent to reduce the viscosity for impregnation or the hot melt method comprising heating the resin composition to reduce the viscosity for impregnation.

The wet method comprises soaking the reinforcing fiber in a solution or dispersion of the resin composition, removing the fiber therefrom, and evaporating the solvent with the use of an oven or the like to obtain the prepreg.

The hot melt method comprises heating the resin composition to reduce the viscosity and impregnating the resulting resin composition directly into the reinforcing fiber via heat pressurization to obtain the prepreg or the hot melt method comprises preparing resin films coated with the resin composition on a release paper, superposing the films on either or both surfaces of the reinforcing fiber, and impregnating the resin into the fiber via heat pressurization to obtain the prepreg. Since the hot melt method does not involve the use of a solvent, resin viscosity needs to be lowered to a given level at the time of impregnation of the reinforcing fiber. This is preferable since substantially no solvent remains in the prepreg.

The fiber-reinforced composite material of the present invention can be produced by, for example, a method wherein more than 1 prepregs produced in the above-described manner are laminated in an arbitrary manner and resin is polymerized therewith while applying heat and pressure. For example, heating temperature or pressure is not particularly limited, heating temperature can be between 150° C. and 400° C., and preferably between 200° C. and 380° C., and pressure can be between 0.1 MPa and 10 MPa, and preferably between 0.2 MPa and 5 MPa.

Heat and pressure can be applied by, for example, the following methods: press molding wherein a prepreg of an arbitrary structure is placed in the mold or on the pressing plate and applying pressure to the closed mold or pressing plate; autoclave molding wherein a prepreg of an arbitrary structure is introduced into an autoclave and subjected to pressurization and heating; bag molding wherein a prepreg of an arbitrary structure is wrapped with a nylon film or the like, the inside thereof is vacuumed, and the prepreg is heated in an oven at the atmospheric pressure; wrapping tape method wherein a tape is wound around the prepreg of an arbitrary structure with applying a tension and heating the prepreg in an oven; or internal pressure molding wherein a prepreg of an arbitrary structure is placed in the mold, and gas or liquid is injected into the core, which is also placed in the mold, for pressurization.

The thus-obtained fiber-reinforced composite material of an exemplary embodiment of the present invention comprises, as the matrix resin, polyarylene sulfide, and the composite material is excellent in terms of, for example, thermoresistance, mechanical properties, flameproofness, and chemical resistance. Since the composite material comprises thermoplastic polyarylene sulfide as the matrix resin, resin can be plasticized via heating. Thus, a fiber-reinforced composite material that can be easily recycled or repaired can be produced.

Hereafter, an exemplary embodiment of the method for producing a fiber-reinforced molding substrate is concretely described.

According to an exemplary embodiment of the production method, the fiber-reinforced molding substrate comprising, as the matrix resin, polyarylene sulfide can be produced from a bundle of continuous reinforcing fibers and cyclic polyarylene sulfide. Components are first described.

The reinforcing fiber used in the present invention is not particularly limited, carbon fiber, glass fiber, aramid fiber, boron fiber, alumina fiber, mineral fiber, silicon carbide fiber, and the like can be used, and two or more types of such fibers can be used in combination. In order to obtain a molded product having a light weight, high strength, and high elastic modulus, use of a carbon fiber is preferable, and use of a carbon fiber having tensile elastic modulus of 200 to 700 GPa is particularly preferable.

As the number of reinforcing fiber monofilaments of the reinforcing fiber bundle increases, such fiber bundle becomes more advantageous in terms of economic efficiency, although it becomes disadvantageous in terms of impregnation of matrix resin. When a bundle of carbon fibers is used, the number of monofilaments is preferably 10,000 or more, more preferably between 15,000 and 100,000, and particularly preferably between 20,000 and 50,000, from the viewpoint of economic efficiency and impregnation properties.

In the present invention, configurations and alignments of the reinforcing fiber bundle can be, for example, unidirectionally aligned fibers, woven fabrics (cloths), knitted goods, braided ropes, tows, and mats. Use of unidirectionally aligned fibers is particularly preferable because strength properties can be easily designed depending on a lamination structure, and use of woven fabrics is preferable because it can be easily shaped into a curved configuration.

In the present invention, cyclic polyarylene sulfide is a cyclic compound comprising, as a principle constitutional unit, a repeat unit represented by formula: —(Ar—S)—, and it is a compound as represented by formula (a) above comprising preferably 80% by weight (or mole %) or more, more preferably 90% by weight (or mole %) or more, and further preferably 95% by weight (or mole %) or more of such repeat unit. Ar represents an arylene group, and preferable examples of Ar include units represented by formulae (b) to (l), and the unit represented by formula (b) is particularly preferable. In such a case, the fiber-reinforced composite material may be produced with the use of the fiber-reinforced molding substrate, so that a material that is particularly excellent in properties such as thermoresistance can be easily produced.

Cyclic polyarylene sulfide may comprise the repeat unit represented by any of formulae (b) to (l) at random or as a block or a mixture thereof. Representative examples include a cyclic homopolymer or copolymer comprising the repeat unit represented by any of formulae (b), (c), (g) to (l), a cyclic polyphenylene sulfide sulfone (formula (e)), cyclic polyphenylene sulfide ketone (formula (d)), cyclic polyphenylene sulfide ether (formula (O), a cyclic random copolymer or cyclic block copolymer comprising any thereof, and a mixture of any thereof. An example of particularly preferable cyclic polyarylene sulfide is cyclic polyphenylene sulfide (hereafter it may be abbreviated as "cyclic PPS") comprising, as the principle constitutional unit, 80% by weight (or mole %) or more, and particularly 90% by weight (or mole %) or more of the p-phenylene sulfide unit represented by the formula shown below in a cyclic compound comprising, as the principle constitutional unit, the repeat unit represented by —(Ar—S)—.

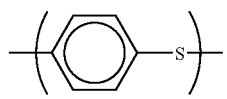

Cyclic polyarylene sulfide may be a single compound having a single number of repeat unit or a mixture of cyclic polyarylene sulfides having different number of repeat units. The mixture of cyclic polyarylene sulfides having different number of repeat units tends to have a lower melting temperature than the single compound having a single number of repeat unit. Thus, the mixture is more preferable from the viewpoint of economic efficiency and productivity of the fiber-reinforced molding substrate.

In an exemplary embodiment of the present invention, the molecular weight of cyclic polyarylene sulfide is less than 5,000, preferably 4,000 or less, and particularly preferably 3,000 or less, in terms of the weight average molecular weight. If the weight average molecular weight is 5,000 or more, impregnation of resin into the reinforcing fiber bundle is deteriorated. The lower limit of the weight average molecular weight is not particularly limited, and the lower limit can be, for example, preferably 300 or higher, and more preferably 500 or higher. The number of repeat units, m, in formula (a) of cyclic polyarylene sulfide is preferably 2 to 50, more preferably 2 to 25, and further preferably 3 to 20. As m becomes larger, the viscosity relatively becomes larger. If m exceeds 50, accordingly, the dissolving or melting temperature of cyclic polyarylene sulfide may be elevated depending on an Ar type. This occasionally complicates impregnation into the reinforcing fiber substrate.

According to an exemplary embodiment of the production method of the present invention, cyclic polyarylene sulfide is subjected to ring-opening polymerization to convert the same into polyarylene sulfide as a result. In the process of ring-opening polymerization, the presence of linear polyarylene sulfide is preferable since the degree of polyarylene sulfide polymerization can be easily elevated. The term "linear polyarylene sulfide" used herein refers to a homooligomer or cooligomer preferably comprising 80% by mole or more of the repeat unit represented by formula: —(Ar—S)— as the principle constitutional unit. Examples of Ar include units represented by formulae (b) to (l), and the unit represented by formula (b) is particularly preferable. As long as the linear polyarylene sulfide oligomer comprises such repeat as a principle constitutional unit, a minor amount of a branched or crosslinked unit represented by, for example, any of formulae (o) to (q) below can be included. The amount of such branched or crosslinked unit to be copolymerized is preferably 0% to 1% by mole relative to a mole of the unit represented by —(Ar—S)—. The linear polyarylene sulfide may be a random copolymer or block copolymer comprising the above repeat unit or a mixture thereof.

Representative examples thereof include polyphenylene sulfide oligomer, polyphenylene sulfide sulfone oligomer, polyphenylene sulfide ketone oligomer, polyphenylene sulfide ether oligomer, a random copolymer and a block copolymer comprising any thereof, and a mixture thereof. An example of a particularly preferable linear polyarylene sulfide oligomer is a linear polyphenylene sulfide oligomer comprising, as the polymer principle constitutional unit, the p-phenylene sulfide unit in amounts of 80% by mole or higher, and particularly 90% by mole or higher.

In the production method of an exemplary embodiment of the present invention, both cyclic polyarylene sulfide and linear polyarylene sulfide can be present without particular limitation before ring-opening polymerization. Formation of a mixture of cyclic polyarylene sulfide and linear polyarylene sulfide in advance (hereafter such mixture is referred to as a "polyarylene sulfide prepolymer") is preferable since the production process can be simplified. The amount of cyclic polyarylene sulfide in the polyarylene sulfide prepolymer is preferably 50 to 99% by weight, more preferably 70 to 97% by weight, and particularly preferably 80 to 95% by weight, in order to sufficiently increase the molecular weight of the resulting polyarylene sulfide.

In the present invention, examples of methods for obtaining the polyarylene sulfide prepolymer include the methods (1) and (2) for producing a polyarylene sulfide prepolymer described above. By repeatedly subjecting the polyarylene sulfide prepolymer to purification, cyclic polyarylene sulfide of higher purity can be obtained.

The polyarylene sulfide prepolymer of an exemplary embodiment of the present invention can comprise, for example, a thermoplastic resin, a thermosetting resin, an elastomer, a rubber component, a flame retardant, an inorganic filler, a conductivity improving agent such as carbon black, a crystal nucleating agent, an antioxidant, an ultraviolet absorber, a dumping agent, an antibacterial agent, an insect repellent, a deodorant, a coloring agent, a pigment, a dye, a thermostabilizer, a release agent, a tackifier, an antistatic agent, a plasticizer, a lubricant, a foaming agent, an antifoaming agent, or a coupling agent within the scope of the present invention.

Also, polyarylene sulfide obtained via ring-opening polymerization according to the process of an exemplary embodiment of the present invention is a homopolymer or copolymer comprising, as the principle constitutional unit, the repeat unit represented by formula: —(Ar—S)—. The molecular weight of polyarylene sulfide is 5,000 or more, preferably 10,000 or more, and more preferably 15,000 or more, in terms of the weight average molecular weight. When the weight average molecular weight is less than 5,000, dynamic properties of the resulting molded product may occasionally be deteriorated. The upper limit of the weight average molecular weight is not particularly limited, and, for example, it is preferably 1,000,000 or less, more preferably 500,000 or less, and particularly preferably 200,000 or less, from the viewpoint of moldability. The weight average molecular weight of the aforementioned polyarylene sulfide and cyclic polyarylene sulfide can be determined via, for example, a conventional gel permeation chromatography (GPC) technique, such as size exclusion chromatography (SEC) equipped with a differential refractive index detector.

Also, polyarylene sulfide may contain some cyclic polyarylene sulfide as a remnant in order to further improve molding processability of the fiber-reinforced molding substrate. A cyclic polyarylene sulfide content is preferably 0.1 to 20% by weight, more preferably 0.5 to 15% by weight, and particularly preferably 1 to 10% by weight, relative to the total weight of polyarylene sulfide.

The method for producing a fiber-reinforced molding substrate comprises at least the following steps. Each step can be carried out off-line; however, steps (I) to (IV) are preferably carried out on-line from the viewpoint of economic efficiency and productivity:

(I) withdrawing and continuously feeding a bundle of continuous reinforcing fibers;

(II) combining cyclic polyarylene sulfide with the reinforcing fiber bundle;

(III) heating the composite obtained in (II) to 200° C. to 450° C.; and (IV) cooling the composite obtained in (III) and continuously withdrawing the same.

The term "steps (I) to (IV) are carried out on-line" refers that all of steps (I) to (IV) are carried out in the same production line continuously (e.g., see FIGS. 12 to 14) or intermittently.

Each step is described.

Step (I) is to feed the reinforcing fiber bundle to the production line. In order to produce with good economic efficiency and productivity, continuous feeding is important. The term "continuous feeding" refers to feeding of the reinforcing fiber bundle as a starting material to the production line without completely cutting the bundle. The rate of feeding may be constant, or feeding may be performed and stopped with intervals. The method may comprise a step of cutting part of the reinforcing fiber bundle to provide a slit therein, in order to improve a shape-retaining property of the fiber-reinforced molding substrate.

Step (I) is intended to withdraw a reinforcing fiber bundle and to dispose the same in a given sequence. Specifically, the bundle of continuous reinforcing fibers to be fed may be in the form of a yarn, unidirectionally aligned sheet, or preform, which is pre-shaped. Specific examples of the methods include: a method wherein a reinforcing fiber bundle is installed on a creel, the fiber bundle is withdrawn, and the fiber bundle is allowed to pass through a roller to be fed to the production line; a method wherein a plurality of fiber bundles are aligned, the aligned bundles are flattened like a sheet, and the sheet-like bundles are allowed to pass through a roll bar to be fed to the production line, and a method wherein a fiber bundle is allowed to pass through a plurality of roll bars disposed so as to form a given shape and fed to the production line. When the reinforcing fiber bundle is processed in the form of a substrate, the bundle may be directly fed to the production line from the wound state. By providing drives on various types of rollers or roll bars, the rate of feeding can be adjusted, which is more preferable in terms of productivity.

Further, step (I) preferably comprises a step of heating a reinforcing fiber bundle to 50° C. to 500° C. from the viewpoint of productivity. By heating the reinforcing fiber bundle, fixation of cyclic polyarylene sulfide to the reinforcing fiber bundle can be improved in step (II). Also, a sizing agent or the like that has adhered to the reinforcing fiber bundle can also be removed. Heating techniques are not particularly limited, and examples thereof include conventional techniques such as non-contact heating by means of hot air or an infrared heater and contact heating by means of a pipe heater or electromagnetic induction.

Step (II) comprises combining cyclic polyarylene sulfide to a reinforcing fiber bundle. Cyclic polyarylene sulfide to be combined herein may be the aforementioned polyarylene sulfide prepolymer. Methods of combining are not particularly limited and preferable examples include the four methods shown below in accordance with the configuration of cyclic polyarylene sulfide.

(1) A method comprising dispersing at least one form of cyclic polyarylene sulfide selected from the group consisting of particulate, fibrous, and flaky forms in a gas phase and allowing the reinforcing fiber bundle to pass through the gas phase. Specific examples include: a method wherein a reinforcing fiber bundle is allowed to pass through a fluidized bed on which cyclic polyarylene sulfide has been sprayed; a method wherein cyclic polyarylene sulfide is directly sprayed on the reinforcing fiber bundle; and a method wherein cyclic polyarylene sulfide is charged and electrostatically adhered to the reinforcing fiber bundle.

(2) A method comprising dispersing or dissolving at least one form of cyclic polyarylene sulfide selected from the group consisting of particulate, fibrous, and flaky forms in a liquid phase and allowing the reinforcing fiber bundle to pass through the liquid phase. The term "disperse (or dispersing)" refers that cyclic polyarylene sulfide would not form a macroaggregate of 1 mm or larger via secondary aggregation and cyclic polyarylene sulfide would maintain a preferable size range in configurations described below. Methods of dispersing or dissolving such cyclic polyarylene sulfide in the liquid phase are not particularly limited. Examples of such methods include conventional methods, such as a method involving the use of an agitation apparatus, a method involving the use of a vibratory apparatus, a method involving the use of an ultrasonic generator, and a method involving the use of a jet apparatus. In order to maintain a dispersed or dissolved state, these methods are more preferably employed in the liquid phase through which a reinforcing fiber bundle is to be passed.

The liquid phase used herein is water or an organic solvent. Use of pure water or industrial water is more preferable from the viewpoint of economic efficiency and productivity. In order to assist dispersion of cyclic polyarylene sulfide, various surfactants, such as anionic, cationic, or nonionic surfactants, may be used in combination. The amount of surfactants to be used is not particularly limited, and an example of a preferable range is between 0.01% and 5% by weight.

A particularly preferable configuration of cyclic polyarylene sulfide is an emulsion or dispersion. In such a case, an average particle diameter is preferably 0.01 to 100 μm, more preferably 0.05 to 50 μm, and further preferably 0.1 to 20 μm, in terms of a dispersion size.

When cyclic polyarylene sulfide is particulate, an average particle diameter is preferably 50 to 300 μm, more preferably 80 to 250 μm, and further preferably 100 to 200 μm from the viewpoint of processability and handleability of particles. When cyclic polyarylene sulfide is fibrous, also, an average fiber diameter is preferably 0.5 to 50 μm, more preferably 1 to 30 μm, and further preferably 5 to 20 μm. An average fiber length is not particularly limited, and an example of a preferable range is between 1 mm and 10 mm. When cyclic polyarylene sulfide is flaky, cyclic polyarylene sulfide preferably has the thickness that is the same as that of the particle and the length is preferably 5 to 100 times larger than the thickness.

The average particle diameter can be determined via conventional techniques, such as a laser diffraction/scattering particle size distribution analyzer. The average fiber diameter, the average fiber length, and the thickness and the length of flakes can be easily measured using an optical microscope. When measuring the average fiber diameter, the average fiber length, and the thickness and the length of flakes using an optical microscope, the fiber is observed at the magnification of 20 to 100 times, and the average of the measured arbitrary 400 points may be obtained.

When an organic solvent is used as a liquid phase, any substance can be used without particular limitation, provided that such substance would not substantially induce unpreferable side reactions, such as inhibition of ring-opening polymerization due to heating of cyclic polyarylene sulfide or degradation or crosslinking of resulting polyarylene sulfide. Examples thereof include N-methyl-2-pyrrolidone, dimethylformamide, dimethyl sulfoxide, acetone, methyl ethyl ketone, diethyl ketone, dimethyl ether, dipropyl ether, tetrahydrofuran, chloroform, methylene chloride, trichloroethylene, dichloroethane, tetrachloroethane, chlorobenzene, methanol, ethanol, propanol, butanol, pentanol, ethylene glycol, propylene glycol, phenol, cresol, polyethylene glycol, benzene, toluene, and xylene. Also, an inorganic compound, such as carbon dioxide, nitrogen, or water, can be used as a solvent in the form of supercritical fluid. Such solvents can be used alone or in combinations of two or more.

Specific examples include a method wherein an emulsion or dispersion of cyclic polyarylene sulfide is fed to a water tank and a reinforcing fiber bundle is allowed to pass through the water tank, a method wherein a reinforcing fiber bundle is allowed to pass through the water tank with the use of a jet flow, a method wherein an emulsion or dispersion of cyclic polyarylene sulfide is directly sprayed on a reinforcing fiber bundle.

In the case of the method (2), further, water or the organic solvent used is more preferably removed (dried) after the reinforcing fiber bundle has been allowed to pass through from the viewpoint of productivity. Examples of removing liquid include conventional techniques, such as air blow, hot air drying, and suction filtration. In such a case, the percentage of water or the organic solvent to be removed from the composite is not particularly limited, and it is preferably 50% to 100%, more preferably 70% to 100%, and further preferably 90% to 100%. Also, it is particularly preferable that the liquid phase after removing liquid be recovered, circulated, and reused as a dispersion medium of cyclic polyarylene sulfide from the viewpoint of productivity.

(3) A method wherein at least one form of cyclic polyarylene sulfide selected from the group consisting of a film, a sheet, and an unwoven fabric is arranged so as to be in contact with the reinforced fiber bundle. The term "film" used herein refers to cyclic polyarylene sulfide having an average thickness of 200 μm or less and the term "sheet" refers to cyclic polyarylene sulfide having an average thickness of over 200 μm. The term "unwoven fabric" refers to a fiber sheet or web in which fibers are unidirectionally or randomly oriented, and spaces between fibers are bound via interlace, fusion, or adhesion. The average thickness can be determined by superposing a plurality of sheets or films on top of each other, measuring arbitrary 10 points using calipers, and dividing the determined thickness by the number of superposed sheets or films.

Specific examples include a method wherein a reinforcing fiber bundle is transferred to a conveyer and film-like cyclic polyarylene sulfide is laminated on either or both surfaces thereof with the aid of a hot roller, a method wherein cyclic polyarylene sulfide in the form of an unwoven fabric is fixed via punching, and a method wherein a reinforcing fiber bundle is bound to cyclic polyarylene sulfide in the form of an unwoven fabric with an air jet.

From the viewpoint of economic efficiency and productivity, cyclic polyarylene sulfide in any form is preferably subjected to roll processing. When it is difficult to subject cyclic polyarylene sulfide to roll processing, cyclic polyarylene sulfide is preferably processed into a relevant form, applied on a release mold, and then subjected to roll processing, for example.

(4) A method comprising melting cyclic polyarylene sulfide via heating and feeding the resultant so as to be in contact with the reinforcing fiber bundle. In the present invention, melting via heating can be carried out with the use of a conventional apparatus, such as an extruder, plunger, or hot-melt bath. It is preferable that the apparatus comprise a function of transporting melted cyclic polyarylene sulfide, such as a screw and a gear pump.

Examples include a method wherein cyclic polyarylene sulfide is fed with the use of an extruder to a mold die, such as a T die or slit die, while melting the same and a reinforcing fiber bundle is allowed to pass through the mold die, a method wherein cyclic polyarylene sulfide is fed to a hot-melt bath with the use of a gear pump and a reinforcing fiber bundle is allowed to pass through the hot-melt bath while stretching the reinforcing fiber bundle, a method wherein melted cyclic polyarylene sulfide is fed to a kiss coater with the use of a plunger pump and a reinforcing fiber bundle is coated with melted cyclic polyarylene sulfide, and a method wherein melted cyclic polyarylene sulfide is fed to a heated rotating roll and a reinforcing fiber bundle is allowed to pass on the surface of the roll.

The methods (1) to (4) preferably comprise a step of heating the composite of the reinforcing fiber bundle and cyclic polyarylene sulfide to preferably 100° C. to 300° C., more preferably 150° C. to 250° C., and further preferably 170° C. to 230° C. This step of heating can soften or melt cyclic polyarylene sulfide, the softened or melted cyclic polyarylene sulfide can be more firmly fixed to the reinforcing fiber bundle. Thus, such step of heating is advantageous in order to enhance productivity. Simultaneously with or immediately after the step of heating, pressure is applied, so that cyclic polyarylene sulfide can impregnate into the reinforcing fiber bundle, and such procedure is thus particularly preferable. In such a case, a pressure is preferably 0.1 to 5 MPa, more preferably 0.3 to 4 MPa, and further preferably 0.5 to 3 MPa from the viewpoint of productivity.

Specific examples include a method wherein a plurality of pressure rollers are provided in the heated chamber and the composite is allowed to pass through therein, a method wherein calendar rollers are provided above and below in the heated chamber and the composite is allowed to pass therebetween, and a method wherein heating and pressurization are simultaneously carried out with the use of a hot roller.

It is more preferable that a reinforcing fiber bundle be subjected to fiber opening before performing the methods (1) to (4). The term "fiber opening" used herein refers to an operation for separating fibers of a convergent reinforcing fiber bundle, which can further enhance impregnation of cyclic polyarylene sulfide. Via fiber opening, the thickness of the reinforcing fiber bundle is reduced. When the width and the thickness of the reinforcing fiber bundle before fiber opening are designated as b1 (mm) and a1 (μm) and the width and the thickness of the reinforcing fiber bundle after fiber opening are designated as b2 (mm) and a2 (μm), the ratio of fiber opening; i.e., (b2/a2)/(b1/a1), is preferably 2.0 or greater, and further preferably 2.5 or greater.

A method for opening fibers of a reinforcing fiber bundle is not particularly limited. Examples of methods that can be employed include a method wherein the fiber bundle is allowed to alternately pass through a concave-convex roll pairs, a method wherein a drum-type roll is used, a method wherein tension fluctuation is applied to an axial oscillation, a method wherein tension of a reinforcing fiber bundle is fluctuated with the use of two friction bodies that vertically and reciprocally move, and a method wherein air is sprayed onto a reinforcing fiber bundle.

Step (III) comprises heating the composite of a reinforcing fiber bundle and cyclic polyarylene sulfide obtained in step (II), and it is important to subject cyclic polyarylene sulfide to ring-opening polymerization via heating to convert the same into polyarylene sulfide. The heating temperature is 200° C. to 450° C., preferably 230° C. to 420° C., more preferably 250° C. to 400° C., and further preferably 280° C. to 380° C. When the heating temperature is lower than 200° C., ring-opening polymerization would not sufficiently proceed, and the resulting fiber-reinforced molding substrate would disadvantageously contain excessive amounts of low-molecular-weight cyclic polyarylene sulfide and have insufficient moldability. Also, it would require excessive time to complete ring-opening polymerization and may disadvantageously deteriorate productivity. When the heating temperature exceeds 450° C., unfavorable side reactions, such as degradation of cyclic polyarylene sulfide and polyarylene sulfide, may occasionally occur.

A shorter reaction time until ring-opening polymerization is completed in step (III) is preferable because the duration of the step can be shortened, the rate of withdrawal can be increased, or other reasons. Thus, a shorter reaction time is preferable in terms of excellent productivity and economic efficiency. The reaction time is preferably 30 minutes or shorter, more preferably 10 minutes or shorter, and further preferably 3 minutes or shorter. The lower limit of the reaction time is not particularly limited, and it can be 0.5 minutes or longer, for example.

In step (III), it is preferable that cyclic polyarylene sulfide be heated under a non-oxidizing atmosphere in the ring-opening polymerization, in order to suppress unfavorable side reactions, such as crosslinking or degradation. The term "non-oxidizing atmosphere" used herein refers to an atmosphere in which an oxygen concentration is 5% by volume or lower, preferably 2% by volume or lower, and further preferably an oxygen-free atmosphere; i.e., an inert gas atmosphere, such as a nitrogen, helium, or argon atmosphere. A nitrogen atmosphere is particularly preferable from the viewpoint of economic efficiency and handleability.

Further, heating is preferably carried out under a reduced pressure of 0.1 to 50 kPa in step (III). More preferably, the atmosphere in the reaction system is first converted into a non-oxidizing atmosphere and then adjusted to a reduced pressure condition. The term "reduced pressure" used herein refers to an atmosphere in the reaction system that is lower than the atmospheric pressure. It is more preferably 0.1 to 20 kPa, and further preferably 0.1 to 10 kPa.

In step (III), further, a pressure is preferably applied simultaneously with or after heating, so that impregnation of a reinforcing fiber bundle with polyarylene sulfide can further be enhanced. A pressure is preferably 0.5 to 10 MPa, more preferably 1 to 8 MPa, and further preferably 2 to 6 MPa, from the viewpoint of the balance between impregnation property and productivity.

Specific examples include a method wherein the composite is allowed to pass through the nitrogen-substituted system while applying pressure by a double-belt press from above and from beneath, a method wherein the composite is allowed to pass through a plurality of calendar rolls while applying pressure in the nitrogen-substituted heating furnace, and a method wherein the composites are placed in press molds at high temperature, spaces between press molds are sealed and pressurized, the atmosphere inside the molds are simultaneously substituted with nitrogen, ring-opening polymerization is performed under a reduced pressure, the spaces between press molds are released after the completion of ring-opening polymerization, and the composites are then withdrawn.

Step (IV) comprises cooling and withdrawing the composite obtained in step (III). Cooling techniques are not particularly limited, and conventional techniques, such as a cooling method via air spraying, a cooling method involving spraying of cooling water, a method comprising allowing the composite to pass through a cooling bath, and a method comprising allowing the composite to pass through the cooling plate can be employed.

The rate of withdrawal in step (IV) directly affects the rate of the step, when the fiber-reinforced molding substrate is produced on-line. Thus, such rate is preferably as high as possible from the viewpoint of economic efficiency and productivity. The rate of withdrawal is preferably 5 to 100 m/min, more preferably 10 to 100 m/min, and further preferably 20 to 100 m/min.

Specific examples include a method comprising withdrawing with the use of a nip roller, a method comprising rewinding with the use of a drum winder, and a method comprising gripping a substrate with a fixture and withdrawing the substrate together with the fixture. When withdrawing a substrate, a substrate may be partially cut with a slitter, may be processed into the form of a sheet of a given length with the use of a guillotine cutter or the like, may be cut into a given length with the use of a strand cutter, or may be kept in the form of a roll.

The method for producing a fiber-reinforced molding substrate can involve other processes, as long as the effects thereof are not adversely affected. Examples of other processes include electron beam irradiation, plasma treatment, intense magnetic field application, surface material lamination, protection film application, and after curing processes.

The fiber-reinforced molding substrate obtained by the production method of an exemplary embodiment of the present invention preferably comprises polyarylene sulfide and reinforcing fiber at a ratio of 10 to 50:50 to 90% by weight, more preferably 20 to 40:60 to 80% by weight, and further preferably 25 to 35:65 to 75% by weight, from the viewpoint of the balance between moldability and dynamic properties of the resulting molded product. Such weight ratio can be easily realized by regulating the amounts of the reinforcing fiber bundle and cyclic polyarylene sulfide to be fed. For example, the amount of the reinforcing fiber bundle to be fed can be adjusted by regulating the rate of withdrawal in step (IV), and the amount of cyclic polyarylene sulfide to be fed can be adjusted using a metering feeder in step (II).

According to the production method of an exemplary embodiment of the present invention, substrates having different impregnation rates can be produced in accordance with applications and purposes of the fiber-reinforced molding substrate. Examples thereof include a highly impregnated prepreg, a semi-impregnated semipreg, and a low-impregnated fabric. In general, highly impregnated substrates are effective in terms of molding that is performed within a short period of time; although such effectiveness is in a trade-off correlation with shaping into the curved configuration.

According to the first preferable embodiment of the fiber-reinforced molding substrate obtained by the production method, accordingly, a percentage of a molded substrate that is impregnated with polyarylene sulfide is from 80% to 100%. This is excellent in terms of production of a molded product of a simpler planar shape with good productivity.

According to the second preferable embodiment of the fiber-reinforced molding substrate obtained by the production method, a percentage of a molded substrate that is impregnated with polyarylene sulfide is from 20% to less than 80%. This method is excellent in that the substrate can be shaped into a curved configuration of a given degree, and lowered productivity at the time of molding can be minimized.

According to the third preferable embodiment of the fiber-reinforced molding substrate obtained by the production method, a percentage of a molded substrate that is impregnated with polyarylene sulfide is from 0% to less than 20%. Such percentage of impregnation is excellent in terms of production of a molded product of a more complicated configuration or a molded product that is not necessarily completely impregnated.

Impregnation is represented by a percentage (%) that is determined by observing a cross section of the fiber-reinforced molding substrate using an optical microscope and dividing the area of polyarylene sulfide that is impregnated by a total of such area and a void area. When measuring areas using an optical microscope, a magnification is set at 20 to 100 times, arbitrary 20 images are measured, and an average may then be determined.

A percentage of impregnation can be regulated by adjusting a temperature or pressure when combining cyclic polyarylene sulfide in step (II) or a temperature or pressure when subjecting cyclic polyarylene sulfide to ring-opening polymerization to convert into polyarylene sulfide in step (III). As the temperature or pressure is elevated, in general, a percentage of impregnation can be improved. Also, a smaller cyclic polyarylene sulfide configuration can further improve impregnation property.

The fiber-reinforced molding substrate obtained by an exemplary embodiment of the present invention can be subjected to molding techniques with excellent productivity, such as autoclave molding, press molding, filament winding molding, and stamping molding. Short-term molding can be realized because of the use of a thermoplastic resin as the matrix resin. Also, integration molding, such as insert molding or outsert molding, can be easily performed. Further, adhesion techniques that yield good productivity, such as reformation by heating, heat seizing, oscillation seizing, and ultrasonic seizing, can be employed after molding. The resulting molded products reflect the features of polyarylene sulfide; i.e., the products are excellent in thermoresistance, chemical resistance, dynamic properties, and flameproofness, and the products can be subjected to a variety of applications.

For example, such products can be subjected to a wide variety of applications such as: automobile-related parts, members, and outer panels; aircraft-related parts, members, and outer panels, such as landing gear pods, winglets, spoilers, edges, rudders, fairings, and ribs; housing parts and members for electric/electronic equipment and OA equipment, such as personal computers, displays, cell phones, and personal digital assistances; sport-related parts and members, such as various rackets, golf club shaft, yacht, boards, ski goods, and fishing poles; industrial materials, such as rods, panels, floors, joints, hinges, and gears; and artificial satellite-related parts.

This description includes part or all of the contents as disclosed in the description and/or drawings of Japanese Patent Application Nos. 2007-72399, 2007-74251, 2007-74253, and 2007-74254, which are priority documents of the present application.

EXAMPLES

The present invention is described in greater detail with reference to the following examples.

Evaluation techniques employed in the present invention are described below.

(1) Weight Average Molecular Weight of Polyarylene Sulfide Prepolymer

The weight average molecular weight (Mw) of the polyarylene sulfide prepolymer was determined via gel permeation chromatography (GPC) in terms of the weight average molecular weight (Mw) of polystyrene.

In Examples 9 to 11, polyarylene sulfide prepolymer samples prepared in reference examples were subjected to measurement. In order to separate the reinforcing fiber bundle and polyarylene sulfide from the fiber-reinforced molding substrate, reflux was carried out using a Soxhlet extractor with the use of 1-chloronaphthalene at 210° C. for 6 hours, and the extracted polyarylene sulfide was subjected to measurement. GPC measurement conditions are described below.
Apparatus: Senshu SSC-7100 (column name: Senshu GPC3506)
Eluant: 1-chloronaphthalene; flow rate: 1.0 ml/min
Column temperature: 210° C.; Detector temperature: 210° C.

(2) Melting Point of Polyarylene Sulfide Prepolymer

A melting point was measured in accordance with JIS K7121 (1987), a DSC system TA 3000 (Mettler) was used, measurement was carried out at a temperature increase rate of 10° C./min, and the melt peak temperature was designated as a melting point.

(3) Average Molecular Weight of Polyarylene Sulfide

The weight average molecular weight of polyarylene sulfide was determined via gel permeation chromatography (GPC) in terms of the weight average molecular weight (Mw) and the number average molecular weight (Mn) of polystyrene. The degree of dispersion (Mw/Mn) was determined based on the measured molecular weight. GPC measurement conditions are described below.
Apparatus: Senshu SSC-7100 (column name: Senshu GPC3506)
Eluant: 1-chloronaphthalene; flow rate: 1.0 ml/min
Column temperature: 210° C.; Detector temperature: 210° C.

(4) Weight Decrease Resulting from Heating of Polyarylene Sulfide

A percentage of weight decrease was measured using a thermogravimetric analyzer (TGA7, Perkin Elmer) under the following conditions. Fine grains of 2 mm or smaller were used as samples.
Measurement atmosphere: nitrogen stream (purity: 99.99% or higher)
Weight of loaded samples; about 10 mg Measurement Conditions:
(a) retention at the program temperature of 50° C. for 1 minute; and
(b) temperature increase from the program temperature of 50° C. to 400° C. at 20° C./min.

A percentage of weight decrease, Δ Wr, was determined by the formula (I) above based on the weight of the sample at 330° C. relative to the weight of the sample at 100° C. in the temperature increase in (b) above.

(5) Average Particle Diameter of Polyarylene Sulfide Powder

The average particle diameter was measured using a laser diffraction scattering particle size distribution analyzer (LMS-24, Seishin Enterprise Co., Ltd.).

(6) Weight of Molding Substrate

A 50 mm×50 mm sheet was cut from the molding substrate, and the weight thereof, W (g), was measured. The weight of the substrate can be determined by the formula: W×400 (g/m$^2$).

(7) Percentage of Fiber-reinforced Molding Substrate Impregnated

The term "percentage . . . impregnated" used in the present invention refers to a degree of resin impregnating into the reinforcing fiber bundle of the fiber-reinforced molding substrate. In an exemplary embodiment of the present invention, the produced fiber-reinforced molding substrate is cut, and a cross section of approximately 10 mm in a width direction is observed using an optical microscope. In this case, a cross section (round or oval), a resin portion, and a void of a reinforcing fiber bundle can be observed. A region connecting fibers that form the outermost layer of the fiber bundle is the inside of the fiber bundle, and an area of the resin portion inside this region is divided by a total of the area and the void area to determine the percentage of impregnation (%). The areas are measured using image software, binarizing the resin portion and the void with contrast, and analyzing the resultant.

(8) Average Fiber Length of Reinforcing Fiber Contained in the Molded Product Obtained with the Use of a Molding Material Part of the molded product was cut and heated in an electric furnace in the air at 500° C. for 30 minutes, and thermoplastic resin was thoroughly removed via incineration to separate reinforcing fibers. At least 400 separated reinforcing fibers were extracted at random, the length thereof was measured using an optical microscope down to the μM, and the weight average fiber length (Lw) and the number average fiber length (Ln) were determined by the formula below.

Weight average fiber length $(Lw)=\Sigma(Li \times Wi/100)$

Number average fiber length $(Ln)=(\Sigma Li)/N\text{total}$

Li: Measured fiber length (i=1, 2, 3, . . . , n)
Wi: Fiber weight fraction of fiber length Li (i=1, 2, 3, . . . , n)
Ntotal: Total number of fibers subjected to fiber length measurement (9) Density of Molded Product Obtained with the Use of a Molding Material Density was measured in accordance with the method A defined in JIS K7112 (1999) 5 (in-water substitution). A test piece of 1 cm×1 cm was cut from the molded product, and the test piece was introduced into a thermoresistant glass container, the container was subjected to vacuum drying at 80° C. for 12 hours, and the temperature was reduced to room temperature using a desiccator while refraining from moisture absorption. Ethanol was used as a soak solution.

(10) Flexural Test of Molded Product Obtained with the Use of Molding Material

In accordance with ASTM D790 (1997), the flexural strength and the flexural modulus were measured by setting the support span at 100 mm using a three-point bend fixture (indenter: 10 mm; fulcrum point: 10 mm) at a crosshead rate of 5.3 mm/min. An "INSTRON®" universal tester (model: 4201, Instron Corp.) was used as the test device.

(11) Izod Impact Testing of Molded Product Obtained with the Use of Molding Material Mold-notched Izod impact testing was carried out in accordance with ASTM D256 (1993). The Izod impact strength (J/m) was measured with the use of the test piece having a thickness of 3.2 mm and a moisture content of 0.1% by weight or lower.

(12) Evaluation of Appearance of Molded Product Obtained with the Use of Molding Material The surface of the thin planar molded product obtained via injection molding (width: 150 mm; length: 150 mm; thickness: 1.2 mm) was visually inspected and the number of dispersion defects of the reinforcing fiber (i.e., swelling or blistering) was measured. Twenty samples were subjected to measurement, the total number of dispersion defects was divided by the number of samples to determine an average number of defects, the determined number of defects was designated as the evaluation standard, and evaluation was made in accordance with the four grades shown below.

- ⊚: No dispersion defects are observed in molded products. Surface appearance is particularly good.
- ○: The average number of defects is less than 0.1/product. Surface appearance is good.
- Δ: The average number of defects is 0.1 to 0.5/product. Surface appearance is somewhat poor.
- x: The average number of defects is over 0.5/product. Dispersion defects are observed in all molded products. Surface appearance is poor.

(13) Evaluation of Environmental Contamination when Performing Injection Molding with the Use of Molding Material Regarding gas generation when performing injection molding at a given temperature, the conditions of white smoke ejection involving an abnormal odor from the ejection nozzle, and the surface defects (i.e., burning, trace of a gas, void) of a thin planar molded product resulting from injection molding (width: 150 mm; length: 150 mm; thickness: 1.2 mm) were visually inspected. The evaluation is made in accordance with the following 4 criteria, and the evaluation results of "○" or higher are acceptable.

- ⊚: No abnormal odor or white smoke is observed, and no defects are observed on the surfaces of the molded products.
- ○: Although no abnormal odor is observed, a small quantity of white smoke is observed. No defects are observed on the surfaces of the molded products.
- Δ: White smoke with an abnormal odor is observed. No defects are observed on the surfaces of the molded products.
- x: White smoke with an abnormal odor is observed. Defects are observed on the surfaces of the molded products.

Reference Example 1

Preparation of Polyphenylene Sulfide Prepolymer 118 kg of 47.5% Sodium hydrosulfide (1,000 moles), 42.3 kg of 96% sodium hydroxide (1,014 moles), 163 kg of N-methyl-2-pyrrolidone (hereafter occasionally abbreviated as "NMP," 1,646 moles), 24.6 kg of sodium acetate (300 moles), and 150 kg of ion exchanged water were loaded in a 1,000-litter autoclave equipped with an agitator, the inside of the autoclave was gradually heated to 240° C. over the period of 3 hours at the ordinary pressure while introducing nitrogen, 211 kg of water and 4 kg of NMP were removed by distillation via a rectifying column, and the reaction vessel was then cooled to 160° C. 0.02 moles of hydrogen sulfide per mole of a sulfur component that had been loaded during this liquid removing operation was dispersed to the outside of the reaction system.

Subsequently, 147 kg of p-dichlorobenzene (1,004 moles) and 129 kg of NMP (1,300 moles) were added, and the reaction vessel was hermetically sealed under the nitrogen gas atmosphere. The temperature was raised to 270° C. at 0.6° C./min with agitation at 240 rpm and maintained at this temperature for 140 minutes. By injecting 18 kg of water (1,000 moles) over the period of 15 minutes, the temperature was reduced to 250° C. at 1.3° C./min. Thereafter, the temperature was reduced to 220° C. at 0.4° C./min and rapidly cooled to around room temperature to obtain slurry (A). Slurry (A) was diluted with 376 kg of NMP to obtain slurry (B).

Slurry (B) (14.3 kg), which had been heated to 80° C., was separated by filtration through a sieve (80 mesh; opening: 0.175 mm), and coarse PPS resin and 10 kg of slurry (C) were obtained. Slurry (C) was loaded in a rotary evaporator, the atmosphere was substituted with nitrogen, and slurry (C) was treated under a reduced pressure at 100° C. to 160° C. for 1.5 hours, followed by treatment in a vacuum dryer at 160° C. for 1 hour. The amount of NMP in the obtained solid was 3% by weight.

After 12 kg of ion exchanged water (1.2 times greater than the amount of slurry (C)) was added to the solid, the resultant was agitated at 70° C. for 30 minutes to obtain a slurry again. The resulting slurry was suction-filtered through a glass filter having openings of 10 to 16 μm. To the resulting white cake, 12 kg of ion exchanged water was added, the resultant was agitated at 70° C. for 30 minutes to prepare a slurry again, suction filtration was performed in the same manner, and vacuum drying was carried out at 70° C. for 5 hours to obtain 100 g of polyphenylene sulfide oligomer. The above procedure was repeated until the amount of the polyphenylene sulfide prepolymer would reach the given level.

4 g of the obtained polyphenylene sulfide oligomer was fractionated and subjected to Soxhlet extraction with 120 g of chloroform for 3 hours. Chloroform was removed from the obtained extract via distillation, 20 g of chloroform was added to the resulting solid again, and the resultant was dissolved at room temperature to obtain a slurry mixture. The resulting mixture was slowly added dropwise to 250 g of methanol with agitation, the precipitate was suction-filtered through a glass filter having openings of 10 to 16 μm, and the resulting white cake was vacuum dried at 70° C. for 3 hours to obtain white powder.

The weight average molecular weight of the white powder was 900. The white powder was subjected to infrared absorption spectroscopy and found to be polyphenylene sulfide based on the absorption spectrum. Also, thermal properties of the white powder were analyzed using a differential scanning calorimeter (the temperature increase rate: 40° C./min). As a result, the white powder was found to show a broad endotherm at about 200° C. to 260° C. and a peak temperature at 215° C.

Also, high-performance liquid chromatography was carried out to separate components from each other, the components were subjected to mass spectral analysis, and molecular weight information was obtained via MALDI-TOF-MS. Thus, the white powder was found to be a mixture comprising cyclic polyphenylene sulfide having 4 to 11 repeat units and linear polyphenylene sulfide having 2 to 11 repeat units, and the ratio of cyclic polyphenylene sulfide to linear polyphenylene sulfide was found to be 9:1 by weight.

The obtained polyphenylene sulfide prepolymer was subjected to frost shattering, the resultant was then subjected to mechanical classification with the use of a mesh to obtain polyphenylene sulfide prepolymer particles (P) having the average particle diameter of 120 μm. The polyphenylene sulfide prepolymer particles (P) were mixed with industrial water containing 0.03% by weight of a surfactant, and the mixture was forcedly agitated by a high-pressure homogenizer to prepare a dispersion (L) (average particle diameter: 8 μm; solid concentration: 10%).

The polyphenylene sulfide prepolymer was dissolved at 200° C. to 300° C., the dissolved prepolymer was coated to a given thickness on a release paper using a knife coater, and a film (F) having the weight 25 g/m$^2$ was prepared.

Reference Example 2

2,383 g of 47% Sodium hydrosulfide (20.0 moles) (Sankyo Chemical Co., Ltd.), 831 g of 96% sodium hydroxide (19.9 moles), 3,960 g of NMP (40.0 moles), and 3,000 g of ion exchanged water were loaded into a 20-litter autoclave equipped with an agitator and a valve at the bottom, the inside of the autoclave was gradually heated to 225° C. over the period of 3 hours at the ordinary pressure while introducing nitrogen, 4,200 g of water and 80 g of NMP were removed by distillation, and the reaction vessel was then cooled to 160° C. The amount of moisture remaining in the reaction system was 0.17 moles per mole of the loaded alkali metal sulfide. The amount of hydrogen sulfide dispersed was 0.021 moles per mole of the loaded alkali metal sulfide.

Subsequently, 2,942 g of p-dichlorobenzene (20.0 moles, Sigma-Aldrich) and 1,515 g of NMP (15.3 moles) were added, and the reaction vessel was hermetically sealed under the nitrogen gas atmosphere. Thereafter, the temperature was raised from 200° C. to 227° C. at 0.8° C./min with agitation at 400 rpm, raised to 274° C. at 0.6° C./min, maintained at 274° C. for 50 minutes, and then raised to 282° C. A drain valve at the bottom of the autoclave was opened, the content was flushed into a container equipped with an agitator over the period of 15 minutes while applying a pressure with nitrogen, most NMP was removed by agitating at 250° C. for a while, and a solid containing polyphenylene sulfide and a salt was recovered.

The resulting solid and 15,120 g of ion exchanged water were introduced into an autoclave equipped with an agitator, washed at 70° C. for 30 minutes, and then suction-filtered through a glass filter. Subsequently, 17,280 g of ion exchanged water, which had been heated to 70° C., was poured into the glass filter, and a cake was obtained via suction filtration. The resulting cake and 11,880 g of ion exchanged water were loaded into an autoclave equipped with an agitator, the atmosphere inside the autoclave was substituted with nitrogen, and the temperature was raised to 192° C. and held at this temperature for 30 minutes. Thereafter, the autoclave was cooled, and the content was removed. The content was suction-filtered through a glass filter, 17,280 g of ion exchanged water at 70° C. was poured therein, and a cake was obtained via suction filtration. The resulting cake was subjected to hot-air drying at 80° C. and further vacuum dried at 120° C. for 24 hours to obtain dry polyphenylene sulfide.

The obtained polyphenylene sulfide (PPS) had the weight average molecular weight of 20,000, the degree of dispersion of 3.8, and the melt viscosity of 12 Pa·s (measurement temperature: 300° C.; shear velocity: 200/sec).

Reference Example 3

Preparation of Polyphenylene Sulfide Prepolymer 1

16.54 kg of 47.5% Sodium hydrosulfide (140 moles), 5.92 kg of 96% sodium hydroxide (142 moles), 22.88 kg of N-methyl-2-pyrrolidone (hereafter occasionally abbreviated as "NMP," 232 moles), 3.44 kg of sodium acetate (42 moles), and 21 kg of ion exchanged water were loaded in a 150-litter autoclave equipped with an agitator, the inside of the autoclave was gradually heated to 240° C. over the period of about 3 hours at the ordinary pressure while introducing nitrogen, 30 kg of water and 550 g of NMP were removed by distillation via a rectifying column, and the reaction vessel was then cooled to 160° C. 0.02 moles of hydrogen sulfide per mole of a sulfur component that had been loaded during this liquid removing operation was dispersed to the outside of the reaction system.

Subsequently, 20.6 kg of p-dichlorobenzene (140.6 moles) and 18 kg of NMP (182 moles) were added, and the reaction vessel was hermetically sealed under the nitrogen gas atmosphere. The temperature was raised to 270° C. at 0.6° C./min with agitation at 240 rpm and maintained at this temperature for 140 minutes. By injecting 2.52 kg of water (105 moles) over the period of 15 minutes, the temperature was reduced to 250° C. at 1.3° C./min. Thereafter, the temperature was reduced to 220° C. at 0.4° C./min and rapidly reduced to around room temperature to obtain 80 kg of slurry (A). Slurry (A) was diluted with 52 kg of NMP to obtain slurry (B).

Slurry (B) (132 kg), which had been heated to 80° C., was separated by filtration through a sieve (80 mesh; opening: 0.175 mm), and coarse PPS resin and 100 kg of slurry (C) were obtained. Slurry (C) was loaded in a rotary evaporator, the atmosphere was substituted with nitrogen, and slurry (C) was treated under a reduced pressure at 100° C. to 160° C. for 1.5 hours, followed by treatment in a vacuum dryer at 160° C. for 1 hour. The amount of NMP in the obtained solid was 3% by weight.

After 120 kg of ion exchanged water (1.2 times greater than the amount of slurry (C)) was added to the solid, the resultant was agitated at 70° C. for 30 minutes to obtain a slurry again. The resulting slurry was suction-filtered through a glass filter having openings of 10 to 16 μm. To the resulting white cake, 120 kg of ion exchanged water was added, the resultant was agitated at 70° C. for 30 minutes to prepare a slurry again, suction filtration was performed in the same manner, and vacuum drying was carried out at 70° C. for 5 hours to obtain 1.2 kg of polyphenylene sulfide oligomer.

The obtained polyphenylene sulfide oligomer was further subjected to Soxhlet extraction with 36 kg of chloroform for 3 hours. Chloroform was removed from the obtained extract via distillation, 6 kg of chloroform was added to the resulting solid again, and the resultant was dissolved at room temperature to obtain a slurry mixture. The resulting mixture was slowly added dropwise to 75 kg of methanol with agitation, the precipitate was suction-filtered through a glass filter having openings of 10 to 16 μm, and the resulting white cake was vacuum dried at 70° C. for 3 hours to obtain 360 g of white powder.

The weight average molecular weight of the white powder was 900. The white powder was subjected to infrared absorption spectroscopy and found to be polyphenylene sulfide based on the absorption spectrum. Also, thermal properties of the white powder were analyzed using a differential scanning calorimeter (the temperature increase rate: 40° C./min). As a result, the white powder was found to show a broad endotherm at about 200° C. to 260° C. and a peak temperature at about 215° C.

Also, high-performance liquid chromatography was carried out to separate components from each other, the components were subjected to mass spectral analysis, and molecular weight information was obtained via MALDI-TOF-MS. Thus, the white powder was found to be a mixture comprising cyclic polyphenylene sulfide having 4 to 11 repeat units and linear polyphenylene sulfide having 2 to 11 repeat units, which is a polyphenylene sulfide prepolymer in which the ratio of cyclic polyphenylene sulfide to linear polyphenylene sulfide was found to be 9:1 by weight.

Reference Example 4

Preparation of Polyphenylene Sulfide Prepolymer 2

1.8 kg of Sodium sulfide nonahydrate (7.5 moles), 15.6 g of 96% sodium hydroxide (0.375 moles), 77.7 kg of NMP (777 moles), and 1.13 g of p-dichlorobenzene (7.65 moles) were loaded into a 150-litter autoclave equipped with an agitator, and the reaction vessel was hermetically sealed under the nitrogen gas atmosphere.

The temperature was raised from room temperature to 200° C. over the period of about 2 hours with agitation at 240 rpm, further raised to 220° C. at 1.0° C./min, and maintained at this temperature for 10 hours. Thereafter, the temperature was reduced to around room temperature to obtain slurry (D). Slurry (D) (80 kg) was diluted with 320 kg of ion exchanged water, and the resultant was agitated at 70° C. for 30 minutes, followed by filtration through a glass filter having the average pore size of 10 to 16 µm. The resulting solid component was dispersed in 80 kg of ion exchanged water, the resultant was agitated at 70° C. for 30 minutes, and filtration was carried out in the same manner. Subsequently, the solid component was dispersed in 80 kg of an aqueous solution of 0.5% acetic acid, the resultant was agitated at 70° C. for 30 minutes, and filtration was carried out in the same manner. The resulting solid component was dispersed again in 80 kg of ion exchanged water, the resultant was agitated at 70° C. for 30 minutes, and filtration was carried out in the same manner. The resulting hydrous cake was dried in a vacuum dryer at 70° C. overnight to obtain 600 g of dry cake.

The thus-obtained dry cake was fractionated in an amount of 600 g and subjected to Soxhlet extraction with 18 kg of tetrahydrofuran for 3 hours. Tetrahydrofuran was removed from the resulting extract by distillation. Acetone (18 kg) was added to the thus-obtained solid, and the resultant was agitated, followed by suction filtration through a glass filter having an opening of 10 to 16 µm to obtain a white cake. The white cake was vacuum dried at 70° C. for 3 hours to obtain 150 g of white powder. The white powder was subjected to infrared absorption spectroscopy and found to be polyphenylene sulfide based on the absorption spectrum.

The resulting white powder was subjected to high-performance liquid chromatography. As a result, the white powder was found to be a mixture comprising cyclic polyphenylene sulfide and linear polyphenylene sulfide in which the ratio of cyclic polyphenylene sulfide to linear polyphenylene sulfide was found to be approximately 1:1.5 by weight (the weight of cyclic PPS/the weight of linear PPS=0.67). Based on the results of analysis, the resulting white powder was found to be a polyphenylene sulfide prepolymer comprising about 40% by weight of cyclic polyphenylene sulfide and about 60% by weight of linear polyphenylene sulfide. As a result of GPC assays, the polyphenylene sulfide prepolymer was found to have the weight average molecular weight of 1,500.

Example 1

The polyphenylene sulfide prepolymer prepared in Reference Example 1 was melted in a hot-melt bath at 240° C. and fed to a kiss coater with the use of a gear pump. The roll heated to 230° C. was coated with the polyphenylene sulfide prepolymer from the kiss coater to form a film.

Carbon fiber Torayca® T700S-24K (Toray Industries, Inc.) was allowed to pass through on the roll while being in contact therewith to adhere a given amount of polyphenylene sulfide prepolymer per unit length of the carbon fiber bundle. Carbon fiber to which the polyphenylene sulfide prepolymer has been adhered is allowed to pass through 10 rolls (φ: 50 mm) that are disposed alternately above and below on a line that freely rotate with the aid of bearings heated to 230° C., and component (B) was allowed to thoroughly impregnate into component (A).

Subsequently, polyphenylene sulfide (PPS) prepared in Reference Example 2 was melted at 320° C. using a monoaxial extruder, and PPS was extruded into a crosshead die mounted at the end of the extruder. Simultaneously, the bundle of continuous reinforcing fibers (A), which had been subjected to the above procedure, was continuously fed into the crosshead die to coat the composite of component (A) and component (B) with the melted component (C). In this case, the amount of component (C) was adjusted so as to bring the reinforcing fiber content to 20% by weight.

The thus-obtained strand was cooled and cut into pieces of 7 mm with a cutter to obtain columnar pellets (long-fiber pellets) having the core-in-sheath type structure.

The long-fiber pellets were produced continuously on-line. The obtained long-fiber pellets did not suffer from fluffs resulting from transportation and exhibited good handleability. The obtained molding material was vacuum dried at 140° C. for 5 hours or longer. The obtained molding material was subjected to molding using an injection mold (Model: J150EII-P, Japan Steel Works, LTD.) with the use of dies for relevant test pieces. Molding was carried out at the cylinder temperature of 350° C. and the mold temperature of 140° C. for a cooling period of 30 seconds. After molding, the products were vacuum dried at 80° C. for 12 hours, and dried test pieces that had been stored in a desiccator at room temperature for 3 hours were evaluated. The results of evaluation are summarized in Table 1.

Comparative Example 1

Polyphenylene sulfide prepared in Reference Example 2 was melted at 320° C. using a monoaxial extruder in the same manner as in Example 1, except that the polyphenylene sulfide prepolymer was not used, and PPS was extruded into a crosshead die mounted at the end of the extruder. Simultaneously, the bundle of continuous reinforcing fibers (A) was continuously fed into the crosshead die to coat component (A) with the melted component (C). In this case, the amount of component (C) was adjusted so as to bring the reinforcing fiber content to 20% by weight.

The thus-obtained strand was cooled and cut into pieces of 7 mm with a cutter to obtain columnar pellets having the core-in-sheath type structure. As a result, polyphenylene sulfide did not impregnate into a reinforcing fiber bundle, the reinforcing fiber dropped from the cut plane, and the pellets suffered from fluffs. The pellets were transported in order to be subjected to injection molding, and more fluffs were generated as a result. Since the pellets could not be used as molding materials because thereof, performance of injection molding was relinquished.

Comparative Example 2

Columnar pellets (long-fiber pellets) of the compositions shown in Table 1 and of the core-in-sheath type structure were prepared in the same manner as in Example 1. The obtained molding materials were also subjected to injection molding and evaluated. The processing conditions and the evaluation results are shown in Table 1.

Example 2

Long-fiber pellets of the core-in-sheath type structure were obtained in the same manner as in Example 1 with the use of Amilan CM3001 (Toray Industries, Inc. nylon 66, melting point: 265° C.) as a thermoplastic resin (C). The obtained molding materials were also subjected to injection molding and evaluated. The processing conditions and the evaluation results are shown in Table 1.

Example 3

Columnar pellets (long-fiber pellets) of the core-in-sheath type structure were obtained in the same manner as in Example 1 with the use of Toraycon 1100S (Toray Industries, Inc. PBT, melting point: 226° C.) as a thermoplastic resin (C). The obtained molding materials were also subjected to injection molding and evaluated. The processing conditions and the evaluation results are shown in Table 1.

Molding materials prepared in Examples 1 to 3 and Comparative Example 2 showed good handleability without generating fluffs due to transportation.

alternately above and below on a line that freely rotate with the aid of bearings, and was then allowed to pass through 10 roll bars (φ: 200 mm) that are disposed in a zig-zag state in the furnace to allow the polyphenylene sulfide prepolymer to thoroughly impregnate into the carbon fiber bundle to convert into a high polymer of polyarylene sulfide. Subsequently, the carbon fiber strand withdrawn from the furnace was cooled via spraying with air and was then wound by a drum winder.

From the wound carbon fiber bundle, ten 10-mm strands were cut, the strands were subjected to reflux in a Soxhlet extractor with the use of 1-chloronaphthalene at 210° C. for 6 hours in order to separate the carbon fiber from polyarylene sulfide, and the molecular weight of the extracted polyarylene sulfide was measured. The weight average molecular weight (Mw) of the obtained PPS was 26,800, the number average

TABLE 1

|  |  | Ex. 1 | Ex. 2 | Ex. 3 | Comp. Ex. 1 | Comp. Ex. 2 |
|---|---|---|---|---|---|---|
| (Composition) | | | | | | |
| Component (A) carbon fiber | Wt % | 20 | 20 | 20 | 20 | 20 |
| Component (B) PAS | Wt % | 5 | 5 | 5 | — | 30 |
| Component (C) thermoplastic resin | Type | PPS | Nylon | PBT | PPS | PPS |
| | Wt % | 75 | 75 | 75 | 80 | 50 |
| (Processing conditions) | | | | | | |
| Kiss coater temperature | ° C. | 230 | 230 | 230 | — | 230 |
| Bearing temperature | ° C. | 230 | 230 | 230 | — | 230 |
| Extrusion temperature | ° C. | 320 | 280 | 260 | 320 | 320 |
| Injection molding temperature | ° C. | 350 | 300 | 280 | — | 350 |
| Mold temperature | ° C. | 140 | 90 | 80 | — | 140 |
| (Properties of molded products) | | | | | | |
| Number average fiber length | mm | 0.65 | 0.55 | 0.60 | — | 0.60 |
| Weight average fiber length | mm | 1.10 | 1.00 | 1.05 | — | 0.95 |
| Density | — | 1.43 | 1.24 | 1.40 | — | 1.42 |
| Flexural modulus | Gpa | 16 | 14 | 14 | — | 13 |
| Flexural strength | Mpa | 270 | 250 | 240 | — | 130 |
| Izod impact | J/m | 70 | 100 | 80 | — | 30 |
| Appearance evaluation | | ⊚ | ⊚ | ⊚ | — | ○ |

Examples and Comparative Examples shown in Table 1 demonstrate the following. The molding materials obtained in Examples 1 to 3 comprise adequate amounts of polyphenylene sulfide prepolymers (B) impregnated into the reinforcing fiber bundle (A). Thus, handleability of the molding materials, dynamic properties of the resulting molded products, and appearance quality thereof are apparently superior to those of Comparative Examples.

Example 4

The polyphenylene sulfide prepolymer prepared in Reference Example 1 is melted in a hot-melt bath at 240° C. and fed to a kiss coater using a gear pump. The roll heated to 230° C. is coated with the polyphenylene sulfide prepolymer from the kiss coater to form a film.

Carbon fiber Torayca® T700S-24K (Toray Industries, Inc.) was allowed to pass through on the roll in contact therewith to adhere a given amount of polyphenylene sulfide prepolymer per unit length of the carbon fiber bundle.

Carbon fiber to which the polyphenylene sulfide prepolymer has been adhered was fed into the furnace heated to 350° C., was allowed to pass through 10 rolls (φ: 50 mm) disposed molecular weight (Mn) thereof was 14,100, and the degree of dispersion (Mw/Mn) was 1.90. Subsequently, weight decrease in the extracted polyarylene sulfide, Δ Wr, was measured and found to be 0.09%.

Subsequently, Ultem 1000R (PEI resin; load deflection temperature: 200° C.; noncrystalline resin, GE Plastics Japan Ltd.) was melted at 360° C. using a monoaxial extruder, and the melt was extruded into a crosshead die mounted at the end of the extruder. Simultaneously, the strands of the bundle of continuous reinforcing fibers (A) and polyarylene sulfide (B') were continuously fed into the crosshead die to coat the composite of component (A) and component (B') with the melted component (C). In this case, the amount of component (C) was adjusted so as to bring the reinforcing fiber content to 20% by weight.

The thus-obtained strand was cooled and cut into pieces of 7 mm with a cutter to obtain columnar pellets (long-fiber pellets) having the core-in-sheath type structure.

The obtained long-fiber pellets did not suffer from fluffs resulting from transportation and exhibited good handleability. The obtained molding material was vacuum dried at 140° C. for 5 hours or longer. The obtained molding material was subjected to molding using an injection mold (Model: J150EII-P, Japan Steel Works, LTD.) with the use of dies for relevant test pieces. Molding was carried out at the cylinder temperature of 380° C. and the mold temperature of 140° C. for a cooling period of 30 seconds. After molding, the products were vacuum dried at 80° C. for 12 hours, and dried test pieces that had been stored in a desiccator at room temperature for 3 hours were evaluated. The results of evaluation are summarized in Table 2.

Comparative Example 3

Ultem 1000R was melted at 360° C. using a monoaxial extruder in the same manner as in Example 4, except that the polyphenylene sulfide prepolymer was not used, and Ultem 1000R was extruded into a crosshead die mounted at the end of the extruder. Simultaneously, the bundle of continuous reinforcing fibers (A) was continuously fed into the crosshead die to coat the component (A) with the melted component (C). In this case, the amount of component (C) was adjusted so as to bring the reinforcing fiber content to 20% by weight.

The thus-obtained strand was cooled and cut into pieces of 7 mm with a cutter to obtain columnar pellets (long-fiber pellets) having the core-in-sheath type structure. As a result, component (C) did not impregnate into the reinforcing fiber bundle, the reinforcing fiber dropped from the cut plane, and pellets suffered from fluffs. The pellets were transported in order to be subjected to injection molding, and more fluffs were generated as a result. Since the pellets could not be used as molding materials, performance of injection molding was relinquished.

Comparative Example 4

Columnar pellets (long-fiber pellets) having the core-in-sheath type structure were produced in the same manner as in Example 4, except that the furnace temperature was set at 280° C. Also, polyarylene sulfide was extracted from the carbon fiber bundle and subjected to measurements. The weight average molecular weight (Mw) of PPS was 6,500, the number average molecular weight (Mn) was 3,100, and the degree of dispersion (Mw/Mn) was 2.08. Subsequently, weight decrease in the extracted polyarylene sulfide, Wr, was measured and found to be 0.29%.

The obtained molding materials were also subjected to injection molding and then evaluated. The processing conditions and the results of evaluation are summarized in Table 2.

Example 5

Columnar pellets (long-fiber pellets) having the core-in-sheath type structure were produced in the same manner as in Example 4 with the use of Torelina A900 (Toray Industries, Inc. PPS resin, melting point: 278° C.) as a thermoplastic resin (C). The obtained molding materials were also subjected to injection molding and then evaluated. The processing conditions and the results of evaluation are summarized in Table 2.

TABLE 2

|  |  | Ex. 4 | Ex. 5 | Comp. Ex. 3 | Comp. Ex. 4 |
| --- | --- | --- | --- | --- | --- |
| (Composition) |  |  |  |  |  |
| Component (A) carbon fiber | Wt % | 20 | 20 | 20 | 20 |
| Component (B) PAS | Wt % | 5 | 5 | — | 5 |
| Component (C) thermoplastic resin | Type | PEI | PPS | PEI | PEI |
|  | Wt % | 75 | 75 | 80 | 75 |
| (Properties of PAS) |  |  |  |  |  |
| Number average molecular weight | — | 14100 | 14300 | — | 3100 |
| Weight average molecular weight | — | 26800 | 27600 | — | 6500 |
| Degree of dispersion | — | 1.9 | 1.9 | — | 2.1 |
| Weight decrease | % | 0.09 | 0.08 | — | 0.29 |
| (Processing conditions) |  |  |  |  |  |
| Kiss coater temperature | ° C. | 230 | 230 | — | 230 |
| Furnace temperature | ° C. | 350 | 350 | — | 280 |
| Extrusion temperature | ° C. | 360 | 340 | 360 | 360 |
| Injection molding temperature | ° C. | 380 | 360 | — | 380 |
| Mold temperature | ° C. | 140 | 140 | — | 140 |
| (Properties of molded products) |  |  |  |  |  |
| Number average fiber length | mm | 0.50 | 0.45 | — | 0.50 |
| Weight average fiber length | mm | 0.90 | 0.85 | — | 0.95 |
| Density | — | 1.35 | 1.42 | — | 1.34 |
| Flexural modulus | Gpa | 17 | 16 | — | 16 |
| Flexural strength | Mpa | 290 | 280 | — | 220 |
| Izod impact | J/m | 60 | 85 | — | 30 |
| Appearance evaluation |  | ○○ | ○○ | — | x |
| Evaluation of environmental contamination |  | ○ | ○○ | — | x |

Examples and Comparative Examples shown in Table 2 demonstrate the following. The molding materials obtained in Examples 4 and 5 comprise polyphenylene sulfide (B') impregnated into the reinforcing fiber bundle (A). Thus, the molding materials obtained in Examples 4 and 5 are apparently superior to Comparative Examples in terms of handleability of the molding materials, free of environmental contamination at the time of molding, dynamic properties of the resulting molded products, and appearance quality.

Examples 6 to 8

Comparative Examples 5 to 7

Prepreg and a fiber-reinforced composite material were prepared using resins having compositions shown in Table 3 in accordance with the method described below and various properties were assayed.

(1) Preparation of Prepreg

The resin composition was melted at a temperature shown in Table 3, and the melted composition was coated to a given thickness on a release paper at a film formation temperature shown in Table 3 with the use of a knife coater to prepare a resin film.

Subsequently, two resin films were superposed on both sides of the carbon fibers, Torayca® T700S-24K (Toray Industries, Inc.), which had been unidirectionally aligned in the form of a sheet, and the fibers was impregnated with the resin composition by applying pressure with the use of the rollers heated to a fiber impregnation temperature shown in Table 3 at the roller pressure shown in Table 3. Thus, a unidirectional prepreg with a carbon fiber content shown in Table 3 was prepared.

(2) Measurement of Fiber Content of Prepreg by Weight

The prepared prepreg was cut into 10-cm-square pieces, the resin composition was dissolved with the use of 100 ml of 1-chloronaphthalene at 230° C. for 30 minutes, and the fiber content by weight was determined based on the ratio of the weight after treatment to the weight before treatment, following drying. The number of measurement, n, was determined to be 3.

(3) Evaluation of Prepreg Impregnation

The prepreg prepared in (1) was cut into 10-cm-square pieces, pressure-sensitive adhesive tapes were applied on both sides, regions where carbon fibers have adhered on both sides of the tapes when peeling the tapes were designated as unimpregnated regions, and evaluation was made on a three grade scale based on the proportion of the area. In Table 3, satisfactory impregnation was represented by ○ (i.e., an unimpregnated region of less than 5%), somewhat poor impregnation was represented by Δ (i.e., an unimpregnated region of 5% to less than 10%), and poor impregnation was represented by x (i.e., an unimpregnated region of 10% or more). The number of measurement, n, was determined to be 3.

(4) Preparation of Laminated Plate of Fiber-reinforced Composite Materials

The unidirectional prepregs prepared in (1) were laminated to a thickness of 2±0.4 mm and 3±0.4 mm by aligning the fiber orientation in order to cut out test pieces used for the flexural test defined by JIS K 7074-1988 and the interlayer shear test defined by JIS K 7078-1991, and a laminated plate was obtained via heating and pressurization using a press mold at 350° C. and 3 MPa for 30 minutes.

(5) Flexural Strength Test

Test pieces was cut from the laminated plate prepared in (4) to sizes defined by JIS K 7074-1988 by designating the long side in a fiber axis direction, and the three point bending flexural test was carried out to determine the flexural strength at 0°.

(6) Interlayer Shear Strength Test

Test pieces was cut from the laminated plate prepared in (4) to sizes defined by JIS K 7078-1991 by designating the long side in a fiber axis direction, and the interlayer shear strength test was carried out to determine the interlayer shear strength.

As shown in Table 3, prepregs obtained in Examples 6 to 8 are excellent in terms of impregnation properties. The fiber-reinforced composite materials prepared with the use of the prepregs obtained in Examples 6 to 8 are excellent in terms of strength and elastic modulus, and particularly in interlayer shear strength.

The prepreg of Comparative Example 5 prepared with the use of the polyphenylene sulfide prepolymer 2 having a cyclic polyphenylene sulfide content, however, is free of problem in terms of impregnation properties, although the flexural strength and the interlayer shear elastic modules of the fiber-reinforced composite material are low, as shown in Table 3. In the case of Comparative Example 6 using a polyphenylene sulfide polymer instead of the polyphenylene sulfide prepolymer 1, impregnation properties of the prepreg are insufficient, regardless of high-temperature and high-pressure conditions for prepreg production. The flexural strength is also low, and the interlayer shear strength is very low. In the case of Comparative Example 7 with a lowered fiber content by weight with the use of the polyphenylene sulfide polymer, impregnation properties of the prepreg are improved compared with those of Comparative Example 6, although the flexural strength of the fiber-reinforced composite material is very low, and the interlayer shear strength is also very low.

TABLE 3

|  | Ex. 6 | Ex. 7 | Ex. 8 | Comp. Ex. 5 | Comp. Ex. 6 | Comp. Ex. 7 |
| --- | --- | --- | --- | --- | --- | --- |
| Polyphenylene sulfide prepolymer 1 synthesized in Reference Ex. 3 | 100 | 100 | 70 | — | — | — |
| Polyphenylene sulfide prepolymer 2 synthesized in Reference Ex. 4 | — | — | 30 | 100 | — | — |
| Polyphenylene sulfide synthesized in Reference Ex. 2 | — | — | — | — | 100 | 100 |
| Ratio of cyclic compound in polyphenylene sulfide by weight (%) | 90 | 90 | 75 | 40 | 0 | 0 |
| Weight average molecular weight of polyphenylene sulfide | 900 | 900 | 1300 | 1500 | 20000 | 20000 |
| Conditions for prepreg production |  |  |  |  |  |  |
| Resin melting temperature (° C.) | 230 | 230 | 230 | 230 | 300 | 300 |
| Film formation temperature (° C.) | 200 | 200 | 200 | 200 | 300 | 300 |
| Fiber impregnation temperature (° C.) | 230 | 230 | 230 | 230 | 300 | 300 |

TABLE 3-continued

|  | Ex. 6 | Ex. 7 | Ex. 8 | Comp. Ex. 5 | Comp. Ex. 6 | Comp. Ex. 7 |
|---|---|---|---|---|---|---|
| Fiber impregnation roller pressure (MPa) | 0.2 | 0.2 | 0.2 | 0.2 | 0.5 | 0.5 |
| Properties of prepreg: fiber content by weight (wt %) | 64 | 76 | 64 | 64 | 64 | 35 |
| Properties of prepreg |  |  |  |  |  |  |
| Impregnation properties | ○ | ○ | ○ | ○ | x | Δ |
| Conditions for producing laminate of fiber-reinforced composite material |  |  |  |  |  |  |
| Molding temperature (° C.) | 360 | 360 | 360 | 360 | 360 | 360 |
| Molding pressure (MPa) | 1 | 1 | 1 | 1 | 1 | 1 |
| Molding time (min) | 30 | 30 | 30 | 30 | 30 | 30 |
| Properties of laminate of fiber-reinforced composite material |  |  |  |  |  |  |
| Flexural strength at 0° (MPa) | 1700 | 2000 | 1500 | 1200 | 1100 | 900 |
| Flexural modulus at 0° (GPa) | 120 | 140 | 120 | 120 | 110 | 65 |
| Interlayer shear strength (MPa) | 81 | 75 | 71 | 58 | 15 | 39 |

Impregnation properties: ○: good; Δ: somewhat poor; x: poor

Example 9

The method for producing a fiber-reinforced molding substrate is described using the apparatus shown in FIG. 12.

Step (I): A plurality of carbon fibers, Torayca® T700S-12K (Toray Industries, Inc.), are aligned in a region with a width of 100 mm so as to adjust the spaces between fiber bundles at 1 mm to 5 mm and the resultant is applied to a production line. The fiber bundle is applied and flattened on the roll bar 1, fed to the impregnation bath 2, allowed to pass through the rotating roller 3 therein, allowed to pass through the hot air drying furnace 4, placed in the double-belt press 5, and then withdrawn by applying a tension by a nip roller 6. The rate of withdrawal is set at 10 m/min, and the reinforcing fiber bundle is heated to 260° C. by the infrared heater 7 for preheating after the step is stabilized.

Step (II): The dispersion (L) of the polyphenylene sulfide prepolymer prepared in Reference Example 1 is fed to the impregnation bath with the aid of the pump 8, and the polyphenylene sulfide prepolymer is applied to the reinforcing fiber bundle by complete soaking of the rotating roller in the dispersion. In this case, the length of the soaked reinforcing fiber bundle is adjusted so as to bring the amount of the polyphenylene sulfide prepolymer adhered to 67% in terms of the fiber content by weight (Wf). The temperature in the hot air drying furnace is adjusted at 140° C., and 90% or more moisture is removed from the reinforcing fiber bundle.

Step (III): Nitrogen purging is carried out from the air inlet 10 of the chamber 9 surrounding the double-belt press to adjust the oxygen concentration in the chamber to 1% by volume or lower. The composite is allowed to pass through the 30-m-long double-belt press located along the direction of the production line while heating at 380° C. and applying a pressure of 5 MPa and subjecting cyclic polyphenylene sulfide to ring-opening polymerization.

Step (IV): Polyphenylene sulfide is solidified on the cooling plate 11 at 50° C., withdrawn by the nip roller, and cut to 1-m pieces by the guillotine cutter 12 to prepare a sheet-like fiber-reinforced molding substrate having a width of 100 mm.

The above steps were all carried out on-line and a fiber-reinforced molding substrate was continuously produced. The impregnation of the resulting fiber-reinforced molding substrate was 85%, and the weight of the substrate was 75 g/m$^2$, which indicates that the resulting substrate is a very rigid unidirectional fiber substrate. The matrix resin was extracted from the substrate and found to comprise polyphenylene sulfide as the main component with the weight average molecular weight of 42,000 and 3% by weight of the polyphenylene sulfide prepolymer having the weight average molecular weight of less than 5,000.

Several pieces of a given size were cut from the resulting fiber-reinforced molding substrate, laminated by aligning the fiber orientation, subjected to heating and pressurization at 350° C. and 3 MPa for 3 minutes using a press mold, and cooled with a cooling press for 5 minutes to obtain a laminated plate. Test pieces for the flexural test were cut from the laminated plate and subjected to the flexural test at 0°. As a result, excellent dynamic properties, i.e., flexural modulus of 125 GPa and flexural strength of 1800, were obtained.

Example 10

The method for producing a fiber-reinforced molding substrate is described using the apparatus shown in FIG. 13.

Step (I): A plurality of carbon fibers, Torayca® T700S-12K (Toray Industries, Inc.), are aligned in a region with a width of 100 mm so as to adjust the spaces between fiber bundles at 1 mm to 5 mm and the resultant is applied to a production line. The fiber bundle is applied and flattened on the roll bar 21, fed to the belt conveyor 22, sandwiched between the pair of above and below impregnation rollers 23, and withdrawn by the drum winder 25 with applying a tension by a nip roller 24. The rate of withdrawal is set at 10 m/min, and the reinforcing fiber bundle is heated to 260° C. by the infrared heater 26 for preheating after the step is stabilized.

Step (II): The film (F) of the polyphenylene sulfide prepolymer prepared in Reference Example 1 is fed to the hot roller 28 with a release paper by means of the rewinding winder 27 so as to laminate the polyphenylene sulfide prepolymer on the reinforcing fiber bundle, and the release paper is then removed by means of the rewinding winder 29. The amount of the polyphenylene sulfide prepolymer adhered was measured and found to be 67% in terms of the fiber content by weight (Wf).

Step (III): Nitrogen purging was carried out from the air inlet 31 of the 30-m-long heating chamber 30 in the direction of the production line, and the oxygen concentration in the heating chamber was adjusted to 1% by volume or lower. The temperature of the heating chamber was set at 380° C., and cyclic polyphenylene sulfide was allowed to pass through the impregnation roller at a pressure of 1 MPa and subjected to ring-opening polymerization.

Step (IV): Polyphenylene sulfide was solidified on the cooling plate 32 at 50° C., withdrawn by the nip roller, and rewinded by the drum winder to obtain a fiber-reinforced molding substrate having the width of 100 mm.

The above steps were all carried out on-line and a fiber-reinforced molding substrate was continuously produced. The impregnation of the resulting fiber-reinforced molding substrate was 43%, and the weight of the substrate was 75 g/m², which indicates that the resulting substrate is a unidirectional fiber substrate that is flexible along the fiber direction. The matrix resin was extracted from the substrate and found to comprise polyphenylene sulfide as the main component with the weight average molecular weight of 38,000 and 5% by weight of the polyphenylene sulfide prepolymer having the weight average molecular weight of less than 5,000.

Several pieces of a given size were cut from the resulting fiber-reinforced molding substrate, laminated by aligning the fiber orientation, subjected to heating and pressurization at 350° C. and 5 MPa for 10 minutes using a press mold, and cooled with a cooling press for 5 minutes to obtain a laminated plate. Test pieces for the flexural test were cut from the laminated plate and subjected to the flexural test in the direction of 0 degree. As a result, excellent dynamic properties, i.e., flexural modulus of 123 GPa and flexural strength of 1760, were obtained.

Example 11

The method for producing a fiber-reinforced molding substrate is described using the apparatus shown in FIG. 14.

Step (I): A plurality of carbon fibers, Torayca® T700S-12K (Toray Industries, Inc.), are aligned in a region with a width of 100 mm so as to adjust the spaces between fiber bundles at 1 mm to 5 mm and the resultant is applied to a production line. The fiber bundle is applied and flattened on the roll bar 41, fed to the calendar roller 42, and withdrawn by the drum winder 44 with applying a tension by a nip roller 43. The rate of withdrawal is set at 10 m/min, and the reinforcing fiber bundle is heated to 260° C. by the infrared heater 45 for preheating after the step is stabilized.

Step (II): The polyphenylene sulfide prepolymer particles (P) prepared in Reference Example 1 are adhered to the reinforcing fiber bundle by spraying from the metering powder feeder 46 so as to bring the fiber content by weight (Wf) to 67%.

Step (III): Nitrogen purging was carried out from the air inlet 48 of the 30-m-long heating chamber 47 in the direction of the production line, and the oxygen concentration in the heating chamber was adjusted to 1% by volume or lower. The temperature of the heating chamber was set at 380° C., and cyclic polyphenylene sulfide was allowed to pass through the calendar roller at 200° C. by applying a tension and subjected to ring-opening polymerization.

Step (IV): Polyphenylene sulfide was solidified on the cooling plate 49 at 50° C., withdrawn by the nip roller, and rewinded by the drum winder to obtain a fiber-reinforced molding substrate having the width of 100 mm.

The above steps were all carried out on-line and a fiber-reinforced molding substrate was continuously produced. The impregnation of the resulting fiber-reinforced molding substrate was 15%, and the weight of the substrate was 75 g/m², which indicates that the resulting substrate is a unidirectional fiber substrate that is flexible as a fabric and is capable of shaping. The matrix resin was extracted from the substrate and found to comprise polyphenylene sulfide as the main component with the weight average molecular weight of 36,000 and 6% by weight of the polyphenylene sulfide prepolymer having the weight average molecular weight of less than 5,000.

Several pieces of a given size were cut from the resulting fiber-reinforced molding substrate, laminated by aligning the fiber orientation, subjected to heating and pressurization at 350° C. and 10 MPa for 30 minutes using a press mold, and cooled with a cooling press for 5 minutes to obtain a laminated plate. Test pieces for the flexural test were cut from the laminated plate and subjected to the flexural test at 0°. As a result, excellent dynamic properties, i.e., flexural modulus of 122 GPa and flexural strength of 1720, were obtained.

All publications, patents, and patent applications cited herein are incorporated herein by reference in their entirety.

The molding material comprising the polyarylene sulfide prepolymer (B) are excellent in terms of fluidity and handleability. When such material is subjected to injection molding, dispersion of the reinforcing fiber in the molded product is good, and molded products having excellent dynamic properties can be easily produced. Thus, such molding material can be applied to a wide variety of molding techniques, such as plunger molding, press molding, or stamping molding, in addition to molding techniques, such as injection molding, blow molding, and insert molding. It should be noted that applications are not limited thereto.

The molding material comprising polyarylene sulfide (B') shows good dispersion of reinforcing fiber in the molded product at the time of injection molding, and molded products having excellent thermoresistance and dynamic properties can be easily produced without causing environmental contamination. Thus, such molding material can be applied to a wide variety of molding techniques, such as plunger molding, press molding, or stamping molding, in addition to molding techniques, such as injection molding, blow molding, and insert molding. It should be noted that applications are not limited thereto.

The prepreg and the fiber-reinforced composite material have high fiber contents and excellent handleability. Thus, the fiber-reinforced composite material using the same can be expected to have excellent mechanical properties, thermoresistance, and flameproofness. Accordingly, such material is suitable for aerospace, general industrial, and other applications, and such material can be particularly preferably used for a laminate for aircrafts, automobiles, ships, and electric/electronic equipment.

According to the production method of an exemplary embodiment of the present invention, polyarylene sulfide can be easily impregnated into the bundle of continuous reinforcing fibers. Thus, economic efficiency and productivity can be improved, and such method is useful for production of fiber-reinforced molding substrates, such as prepregs, semipregs, and fabrics.

The invention claimed is:

1. A molding material comprising:
   (i) 1 to 50% by weight of a bundle of continuous reinforcing fibers (A);
   (ii) 0.1 to 10% by weight of a polyarylene sulfide prepolymer (B) comprising at least 50% by weight of cyclic polyarylene sulfide and having a weight average molecular weight of less than 10,000 or polyarylene sulfide (B') having a weight average molecular weight of 10,000 or greater and having a degree of dispersion represented by weight average molecular weight/number average molecular weight of 2.5 or smaller; and
   (iii) 40 to 98.9% by weight of a thermoplastic resin (C),
   wherein component (C) is adhered to a composite of component (A) and component (B) or (B').

2. The molding material according to claim 1, wherein the melting point of component (B) is 100° C. to 250° C.

3. The molding material according to claim 1, wherein a decrease in the weight of component (B') when heated satisfies the condition represented by the equation below:

$$\Delta Wr = (W1-W2)/W1 \times 100 \leq 0.18 (\%)$$

wherein $\Delta Wr$ represents a percentage of weight decrease (%), which is determined based on the weight of a sample (W2) at 330° C. relative to the weight of a sample (W1) at 100° C. when performing thermogravimetric analysis under an ordinary pressure and in a non-oxidizing atmosphere from 50° C. to an arbitrary temperature of 330° C. or higher at a temperature increase rate of 20° C/min.

4. The molding material according to claim 1, wherein component (A) comprises at least 10,000 carbon fiber monofilaments.

5. The molding material according to claim 1, wherein component (ii) is component (B), and component (C) is at least one component selected from among polyamide resin, polyester resin, and polyphenylene sulfide resin.

6. The molding material according to claim 1, wherein component (ii) is component (B'), and component (C) is at least one component selected from among polyamide resin, polyetherimide resin, polyamide imide resin, polyether ether ketone resin, and polyphenylene sulfide resin.

7. The molding material according to claim 1, wherein component (A) is arranged substantially parallel to the direction of a shaft center and the length of component (A) is substantially the same as that of the molding material.

8. The molding material according to claim 7, wherein the composite of component (A) and component (B) or (B') has a core structure and component (C) surrounds the composite to form a core-in-sheath structure.

9. The molding material according to claim 8, wherein the form of the molding material is a long-fiber pellet.

10. The molding material according to claim 1, wherein the length of the molding material is 1 mm to 50 mm.

* * * * *